(12) United States Patent
Koito et al.

(10) Patent No.: US 12,345,983 B2
(45) Date of Patent: Jul. 1, 2025

(54) LIGHT ADJUSTMENT DEVICE AND PANEL UNIT

(71) Applicant: Japan Display Inc., Tokyo (JP)

(72) Inventors: Takeo Koito, Tokyo (JP); Kojiro Ikeda, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/789,877

(22) Filed: Jul. 31, 2024

(65) Prior Publication Data

US 2024/0385483 A1    Nov. 21, 2024

Related U.S. Application Data

(63) Continuation of application No. PCT/JP2022/044878, filed on Dec. 6, 2022.

(30) Foreign Application Priority Data

Feb. 14, 2022    (JP) ................. 2022-020863

(51) Int. Cl.
  *G02F 1/1337*  (2006.01)
  *G02F 1/1333*  (2006.01)
  *G02F 1/139*   (2006.01)

(52) U.S. Cl.
  CPC .. *G02F 1/133769* (2021.01); *G02F 1/133305* (2013.01); *G02F 1/133796* (2021.01); *G02F 1/139* (2013.01)

(58) Field of Classification Search
  CPC ......... G02F 1/133769; G02F 1/133305; G02F 1/133796; G02F 1/139; G02F 1/133601; G02F 1/13471; G02F 1/13; G02F 1/1345; G02F 1/1347; F21V 9/40; F21V 9/00; F21Y 2107/70

See application file for complete search history.

(56) References Cited

U.S. PATENT DOCUMENTS

| | | | |
|---|---|---|---|
| 2018/0011383 A1* | 1/2018 | Higashihara | B32B 17/10513 |
| 2020/0081310 A1 | 3/2020 | Higashihara et al. | |
| 2021/0199999 A1 | 7/2021 | Ohira | |
| 2022/0299826 A1 | 9/2022 | Kurokawa et al. | |

(Continued)

FOREIGN PATENT DOCUMENTS

| | | |
|---|---|---|
| JP | 63-236016 A | 9/1988 |
| JP | H02-065001 A | 3/1990 |
| JP | 5-159613 A | 6/1996 |

(Continued)

OTHER PUBLICATIONS

Search report issued in related International Patent Application No. PCT/JP2022/044878 mailed on Feb. 21, 2023, and English translation of same. 7 pages.

(Continued)

*Primary Examiner* — Donald L Raleigh
(74) *Attorney, Agent, or Firm* — K&L Gates LLP

(57) ABSTRACT

A light adjustment device includes a panel unit in which a plurality of light adjustment panels are stacked in a first direction, each light adjustment panel being shaped as a polygon and including a first substrate that is translucent and a second substrate that is translucent and overlapping the first substrate, and a light source disposed on one side relative to the panel unit in the first direction.

11 Claims, 17 Drawing Sheets

(56) References Cited

U.S. PATENT DOCUMENTS

2022/0350183 A1   11/2022   Hyodo et al.

FOREIGN PATENT DOCUMENTS

| | | |
|---|---|---|
| JP | 10-253995 A | 9/1998 |
| JP | 2018-528461 A | 9/2018 |
| JP | 2020-027210 A | 2/2020 |
| JP | 2020-042193 A | 3/2020 |
| JP | 2020-194086 A | 12/2020 |
| JP | 2021-092686 A | 6/2021 |
| JP | 2021-113951 A | 8/2021 |
| WO | WO2006/035482 A1 | 4/2006 |

OTHER PUBLICATIONS

Written Opinion issued in related International Patent Application No. PCT/JP2022/044878 mailed on Feb. 21, 2023. 5 pages.
Office Action issued in related Japanese Patent Application No. 2023-580085, mailed on Nov. 5, 2024 and English translation of same. 8 pages.

* cited by examiner

FIG.14
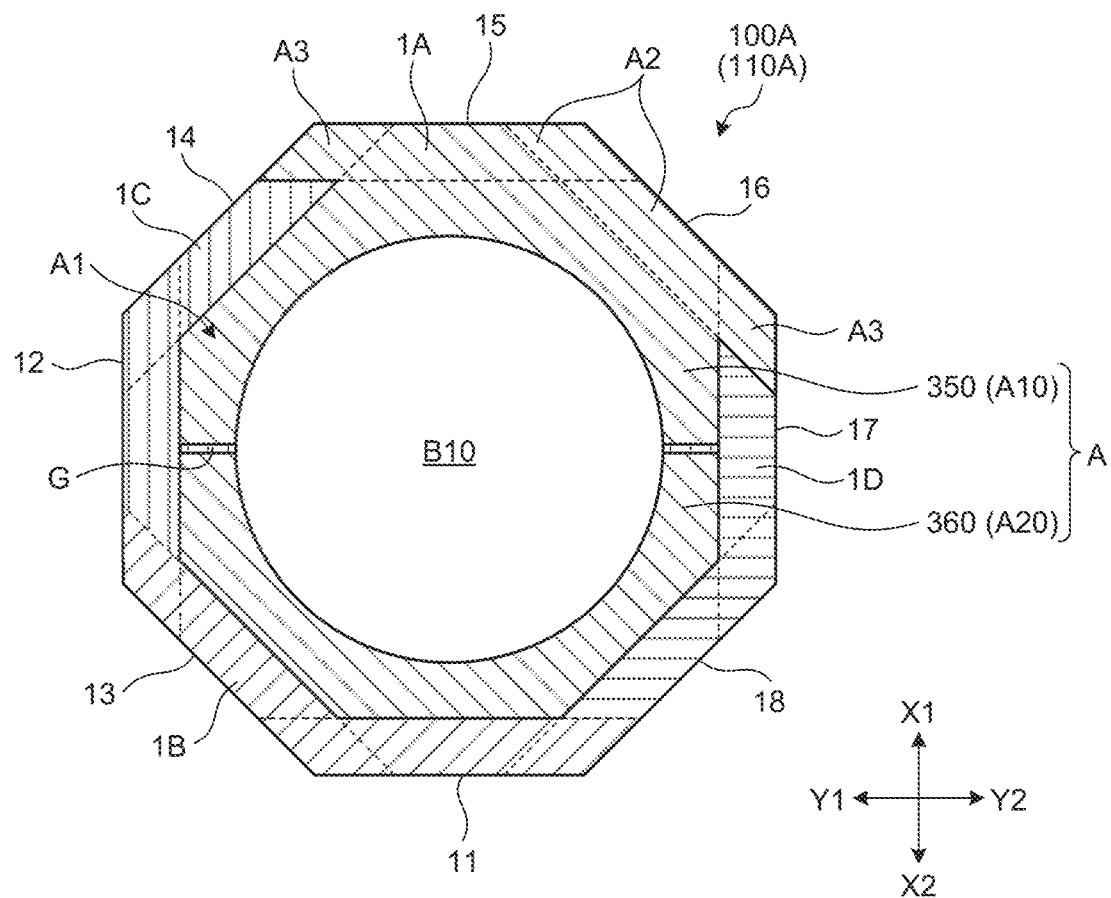
 ···PORTION SHADED BY LIGHT ADJUSTMENT PANEL 1A
 ···PORTION SHADED BY LIGHT ADJUSTMENT PANEL 1B
 ···PORTION SHADED BY LIGHT ADJUSTMENT PANEL 1C
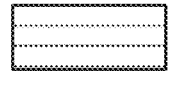 ···PORTION SHADED BY LIGHT ADJUSTMENT PANEL 1D

LIGHT ADJUSTMENT DEVICE AND PANEL UNIT

CROSS-REFERENCE TO RELATED APPLICATION

This application is a continuation of International Patent Application No. PCT/JP2022/044878 filed on Dec. 6, 2022 which designates the United States, incorporated herein by reference, and which claims the benefit of priority from Japanese Patent Application No. 2022-020863 filed on Feb. 14, 2022, incorporated herein by reference.

BACKGROUND

1. Technical Field

The present disclosure relates to a light adjustment device and a panel unit.

2. Description of the Related Art

In an illumination instrument, a light source such as an LED is combined with a thin lens provided with a prism pattern, and the distance between the light source and the thin lens is changed to change a light distribution angle. In such an illumination instrument, a small-sized motor is used to drive the thin lens to change the distance between the light source and the thin lens.

Japanese Patent Application Laid-open Publication No. H02-65001 discloses an illumination instrument in which the front of a transparent light bulb is covered by a liquid crystal light adjustment element, and the transmittance of a liquid crystal layer is changed to switch directly reaching light and scattering light.

In a configuration including a liquid crystal cell, electrodes are provided on two substrates sandwiching the liquid crystal layer, and the orientations of liquid crystal molecules are controlled by applying drive voltage between the electrodes provided on the two substrates, respectively. An alignment film is provided in a region in which the orientations of liquid crystal molecules can be controlled with the provided electrodes, but liquid crystal molecules cannot be controlled in the surrounding region, and accordingly, orientation disorder occurs and light leakage potentially occurs.

The present invention is intended to provide a light adjustment device and a panel unit with less light leakage.

SUMMARY

A light adjustment device according to an embodiment of the present disclosure includes a panel unit in which a plurality of light adjustment panels are stacked in a first direction, each light adjustment panel being shaped as a polygon and including a first substrate that is translucent and a second substrate that is translucent and overlapping the first substrate, and a light source disposed on one side relative to the panel unit in the first direction. The first substrate or the second substrate in each of the light adjustment panels includes a light adjustment region that is irradiated with light from the light source, and a first wire and a second wire disposed around the light adjustment region, the first wire serves as a first shaded region covering an area between at least one side among a plurality of sides of the polygon and the light adjustment region, the second wire serves as a second shaded region covering an area between a non-shaded region at an edge part along another side among the sides and the light adjustment region, and when the panel unit is viewed in the first direction, the first wires of the respective light adjustment panels are disposed along all sides of the panel unit and shade non-shaded regions of the respective light adjustment panels.

A light adjustment device according to an embodiment of the present disclosure includes a panel unit in which a plurality of light adjustment panels are stacked in a first direction, each light adjustment panel being shaped as a polygon and including a first substrate that is translucent and a second substrate that is translucent and overlapping the first substrate, and a light source disposed on one side relative to the panel unit in the first direction. The first substrate or the second substrate in each of the light adjustment panels is provided with a strip-shaped electrode extending along at least one side of the polygon and having shading capability, and the strip-shaped electrodes are disposed along all sides of the panel unit when the panel unit is viewed in the first direction.

A panel unit according to an embodiment is disclosed. A plurality of light adjustment panels are stacked in a first direction, each light adjustment panel including a first substrate that is translucent and a second substrate that is translucent and overlapping the first substrate. The first substrate or the second substrate in each of the light adjustment panels includes a light adjustment region that transmits light at a central part and also includes a peripheral region that encloses the light adjustment region, a part of the peripheral region being shaded by a shaded region, and the light adjustment panels are relatively rotated with respect to and superimposed on each other, and peripheral regions of the light adjustment panels are shaded by one another with the shaded regions thereof when the panel unit is viewed in the first direction.

BRIEF DESCRIPTION OF THE DRAWINGS

FIG. 14 is a schematic diagram illustrating a shaded state of the light adjustment device according to the second embodiment when viewed from the upper side;

DETAILED DESCRIPTION

Figure 1:
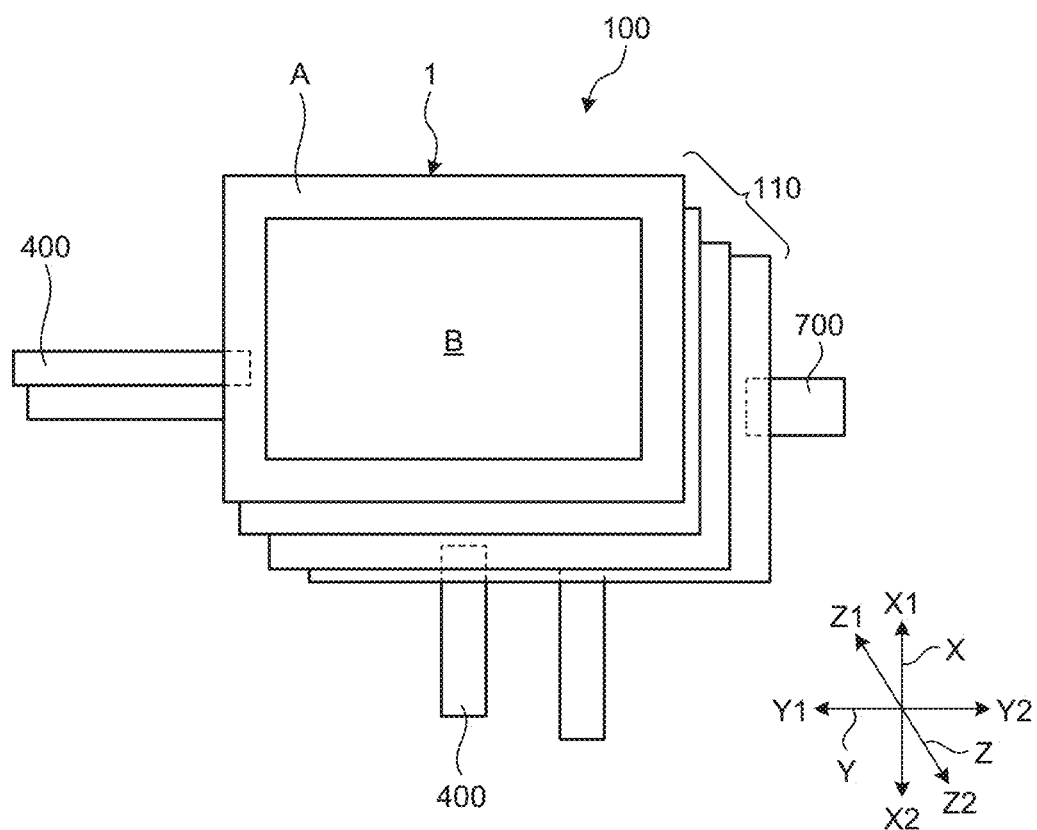
FIG. 1 is a perspective view schematically illustrating a light adjustment device according to a first embodiment.

Aspects (embodiments) of the present disclosure will be described below in detail with reference to the accompanying drawings. Contents described below in the embodiments do not limit the present disclosure. Components described below include those that could be easily thought of by the skilled person in the art and those identical in effect. Components described below may be combined as appropriate.

What is disclosed herein is merely exemplary, and any modification that could be easily thought of by the skilled person in the art as appropriate without departing from the gist of the disclosure is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and drawings, any element same as that already described with reference to an already described drawing is denoted by the same reference sign, and detailed description thereof is omitted as appropriate in some cases.

In an XYZ coordinate system illustrated in the drawings, an X direction is the front-back direction, and an X1 side is opposite an X2 side. The X1 side is also referred to as a back side, and the X2 side is also referred to as a front side. A Y direction is the right-left direction, and a Y1 side is opposite a Y2 side. The Y1 side is also referred to as a left side, and the Y2 side is also referred to as a right side. A Z direction is the up-down direction (stacking direction). A Z1 side is opposite a Z2 side. The Z1 side is also referred to as an upper side, and the Z2 side is also referred to as a lower side. The Z direction is also referred to as a first direction, the Z2 side is also referred to as one side in the first direction, and the Z1 side is also referred to as the other side in the first direction.

First Embodiment

FIG. 1 is a perspective view schematically illustrating a light adjustment device according to a first embodiment.

Figure 2:
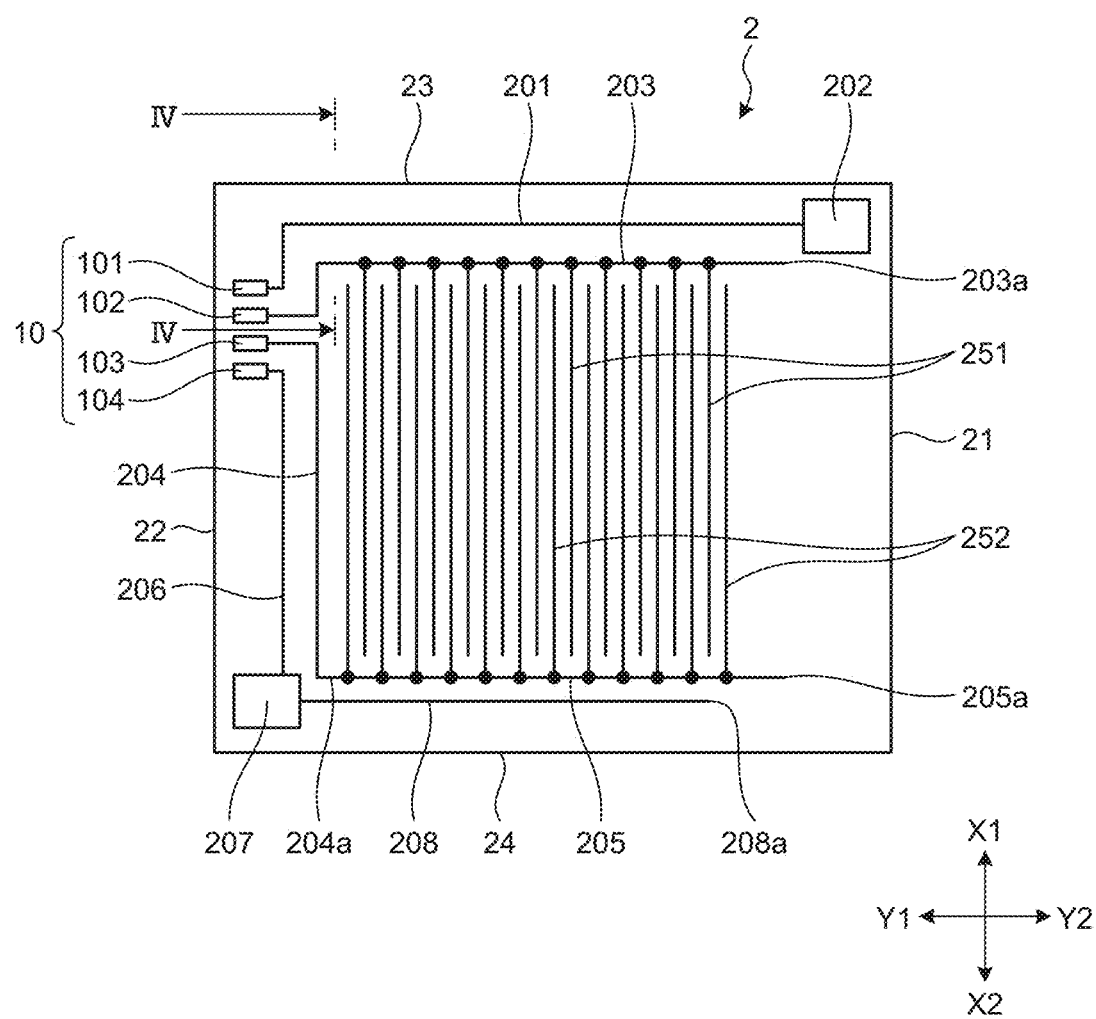
FIG. 2 is a schematic diagram of an array substrate according to the first embodiment when viewed from the upper side.
Figure 3:
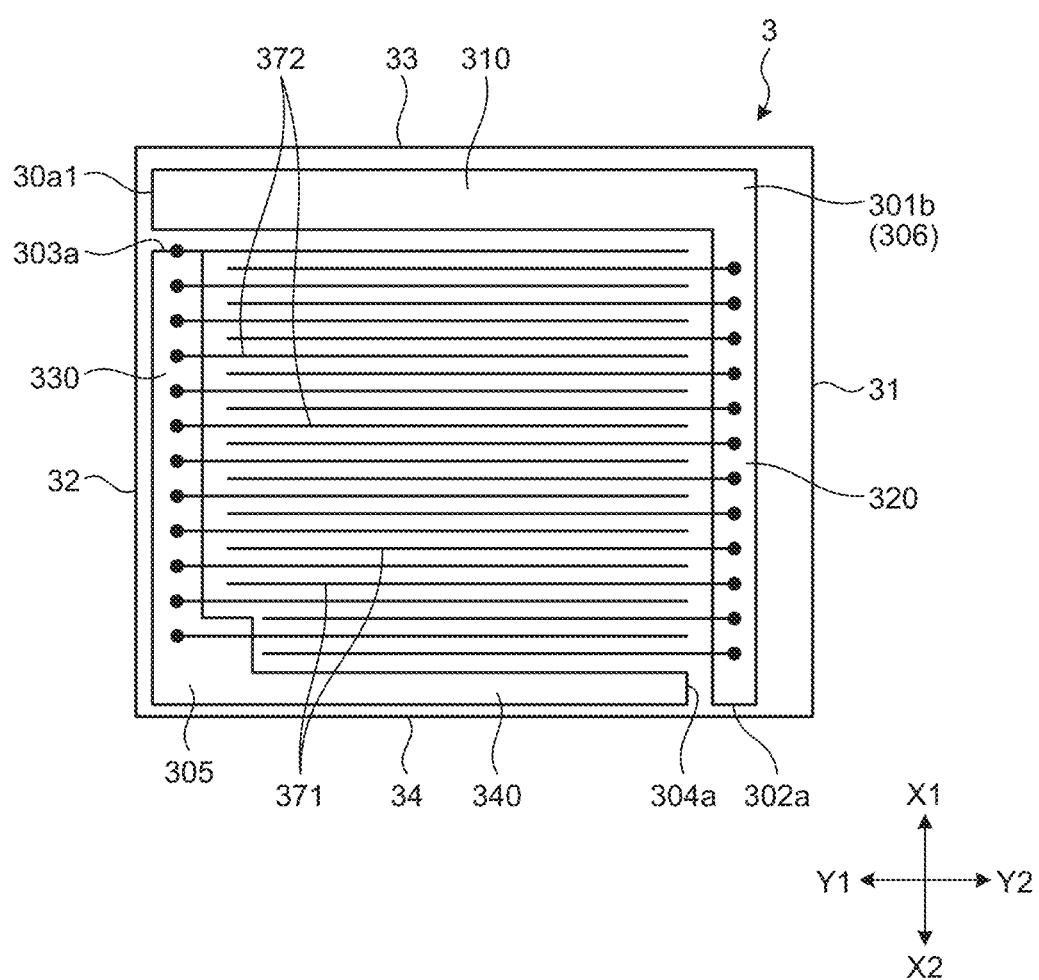
FIG. 3 is a schematic diagram of a counter substrate according to the first embodiment when viewed from the upper side.

FIG. 2 is a schematic diagram of an array substrate according to the first embodiment when viewed from the upper side. FIG. 3 is a schematic diagram of a counter substrate according to the first embodiment when viewed from the upper side.

As illustrated in FIG. 1, a light adjustment device 100 according to the first embodiment includes a panel unit 110, flexible printed circuits (FPC) 400, and a light source 700. In the light adjustment device 100 according to the present embodiment, liquid crystal cells for p-wave polarization and liquid crystal cells for s-wave polarization are stacked and combined.

Although the panel unit 110 is shaped as a quadrilateral in plan view in the first embodiment as illustrated in FIG. 1, a panel unit of the present invention is not limited to a quadrilateral but includes various polygons such as an octagon, a decagon, a dodecagon, and an icosagon. In other words, the shape of the panel unit 110 according to the present invention is a polygon with three or more sides. The panel unit 110 is formed by stacking a plurality of light adjustment panels 1 in the Z direction (first direction). In the present embodiment, a plurality (in the embodiment, four) of light adjustment panels 1 are stacked. The shape of each light adjustment panel 1 is a polygon with four or more sides. The light adjustment panels 1 are electrically coupled to the respective flexible printed circuits 400.

Each light adjustment panel 1 includes an array substrate (first substrate) 2 that is translucent and a counter substrate (second substrate) 3 that is translucent and disposed on the upper side relative to the array substrate 2. The array substrate 2 will be described below.

As illustrated in FIG. 2, in the present embodiment, the array substrate 2 is shaped as a quadrilateral and has a first side 21, a second side 22, a third side 23, and a fourth side 24. As illustrated in FIG. 2, wires, liquid crystal drive electrodes, and coupling portions are provided on the array substrate 2. A coupling portion 202 of the array substrate 2 and a coupling portion 306 of the counter substrate 3 (refer to FIG. 3) are electrically coupled to each other through a conductive pillar (not illustrated) through which conduction is possible. Similarly, a coupling portion 207 of the array substrate 2 and a coupling portion 305 of the counter substrate 3 (refer to FIG. 3) are electrically coupled to each other through a conductive pillar (not illustrated) through which conduction is possible.

As illustrated in FIG. 2, a terminal group 10 includes a first terminal 101, a second terminal 102, a third terminal 103, and a fourth terminal 104. The first terminal 101, the second terminal 102, the third terminal 103, and the fourth terminal 104 are arranged in the X direction.

The first terminal 101 and the coupling portion 202 are coupled to each other through a wire 201. The wire 201 extends in the Y direction. A wire 203 is coupled to the second terminal 102. The wire 203 extends in the Y direction. The wire 203 is positioned on the X2 side relative to the wire 201. Wires 204 and 205 are coupled to the third terminal 103. The wire 204 extends in the X direction. The wire 204 extends from the third terminal 103 to an end 204a. The wire 205 extends in the Y direction. The wire 205 extends from the end 204a to an end 205a. Wires 206 and 208 are coupled to the fourth terminal 104. The wire 206 extends in the X direction. The wire 206 extends from the fourth terminal 104 to the coupling portion 207. The wire 208 extends in the Y direction. The wire 208 extends from the coupling portion 207 to an end 208a. The wire 206 is positioned on the Y1 side relative to the wire 204, and the wire 208 is positioned on the X2 side relative to the wire 205.

A plurality of liquid crystal drive electrodes 251 are coupled to the wire 203. The liquid crystal drive electrodes 251 extend straight in the X direction. The liquid crystal drive electrodes 251 are disposed at equal intervals in the Y direction. A plurality of liquid crystal drive electrodes 252 are coupled to the wire 205. The liquid crystal drive electrodes 252 extend straight in the X direction. The liquid crystal drive electrodes 252 are disposed at equal intervals in the Y direction. The liquid crystal drive electrodes 251 and 252 are alternately arranged in the Y direction.

The counter substrate 3 will be described below. As illustrated in FIG. 3, the counter substrate 3 is shaped as a quadrilateral and has a first side 31, a second side 32, a third side 33, and a fourth side 34. The first side 31 and the second side 32 are parallel to each other and extend in the X direction. The third side 33 and the fourth side 34 are parallel to each other and extend in the Y direction. Four strip-shaped electrodes 310, 320, 330, and 340 are provided on the counter substrate 3. The strip-shaped electrodes 310, 320, 330, and 340 are metal electrodes having shading capability. The strip-shaped electrodes 310, 320, 330, and 340 are formed by a thin film formation method such as sputtering or vacuum evaporation coating. The strip-shaped electrodes 310, 320, 330, and 340 contain metal having shading capability. The metal having shading capability is, for example, molybdenum (Mo), aluminum (Al), nickel (Ni), or copper (Cu). Molybdenum (Mo) and aluminum (Al) are materials commonly used for wires and electrodes, which reduces necessity for new preparation, and thus are advantageous for manufacturing of strip-shaped electrodes and keep cost low. Nickel (Ni) and copper (Cu) are materials having low reflectance and are thus advantageous as shading measures.

The strip-shaped electrode 310 is positioned at an end part of the counter substrate 3 on the X1 side. The strip-shaped electrode 310 extends in the Y direction along the third side 33. The strip-shaped electrode 310 extends an end 301a to an end 301b. The end 301b is the coupling portion 306. The strip-shaped electrode 320 is positioned at an end part of the counter substrate 3 on the Y2 side. The strip-shaped electrode 320 extends in the X direction along the first side 31. The strip-shaped electrode 320 extends from the end 301b to an end 302a. The strip-shaped electrodes 310 and 320 are connected to form an L shape.

The strip-shaped electrode 330 is positioned at an end part of the counter substrate 3 on the Y1 side. The strip-shaped electrode 330 extends in the X direction along the second side 32. The strip-shaped electrode 330 extends from an end 303a to the coupling portion 305. The strip-shaped electrode 340 is positioned at an end part of the counter substrate 3 on the X2 side. The strip-shaped electrode 340 extends in the Y direction along the fourth side 34. The strip-shaped electrode 340 extends from the coupling portion 305 to an end 304a. The strip-shaped electrodes 330 and 340 are connected to form an L shape.

A plurality of liquid crystal drive electrodes 371 are coupled to the strip-shaped electrode 320. The liquid crystal drive electrodes 371 extend straight in the Y direction. The liquid crystal drive electrodes 371 are disposed at equal intervals in the X direction. A plurality of liquid crystal drive electrodes 372 are coupled to the strip-shaped electrode 330. The liquid crystal drive electrodes 372 extend straight in the Y direction. The liquid crystal drive electrodes 372 are disposed at equal intervals in the X direction. The liquid crystal drive electrodes 371 and 372 are alternately arranged in the X direction.

As described above, the edge parts of the counter substrate 3 are surrounded by the four strip-shaped electrodes 310, 320, 330, and 340. In other words, the strip-shaped electrodes 310, 320, 330, and 340 are disposed along all sides of the panel unit 110 when the panel unit 110 is viewed in the up-down direction (first direction).

Figure 4:
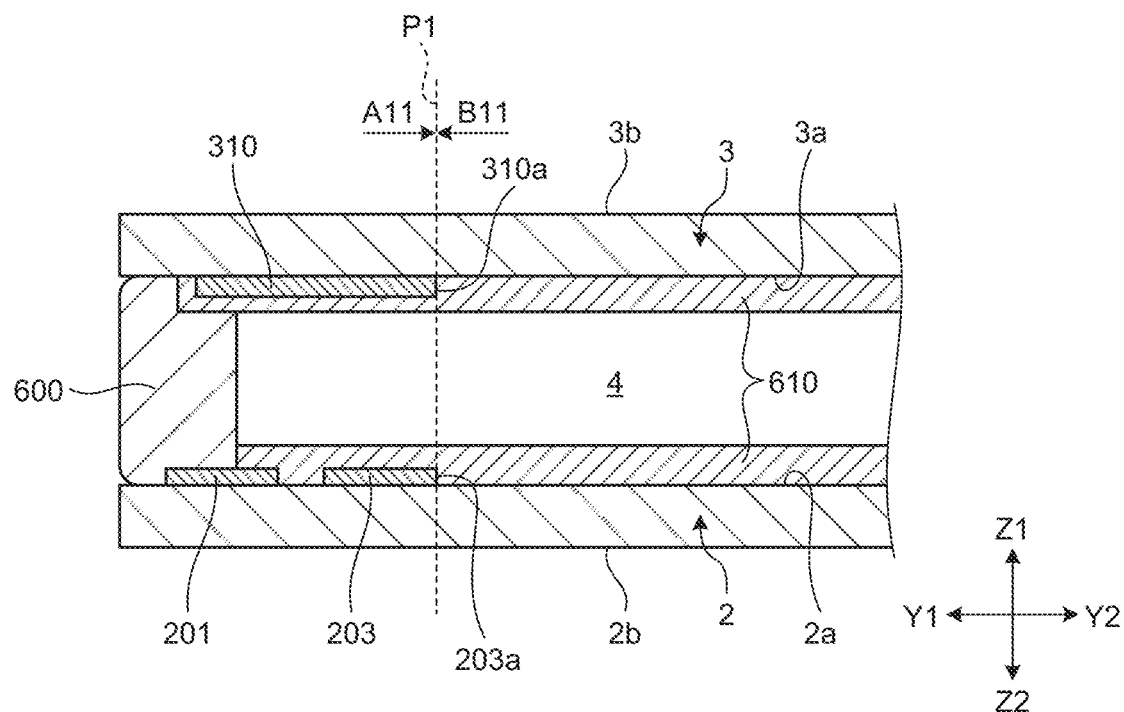
FIG. 4 is a schematic diagram illustrating a section along line IV-IV in FIG. 2.
Figure 5:
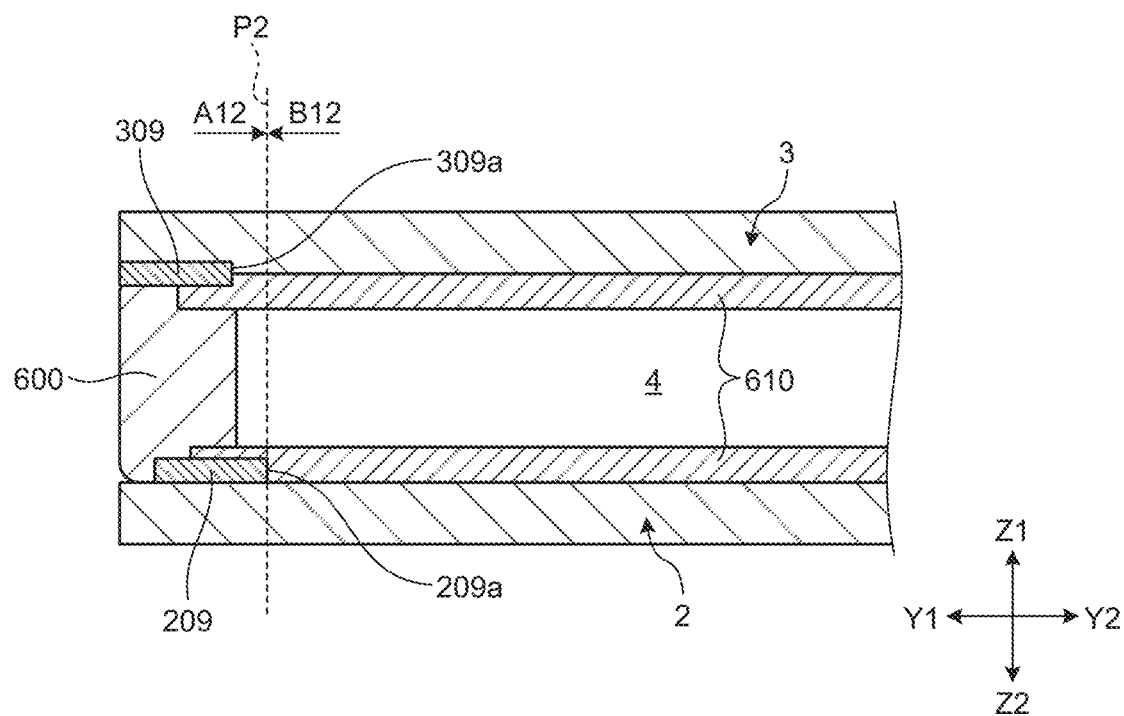
FIG. 5 is a schematic diagram illustrating a section in a comparative example and corresponding to FIG. 4.

FIG. 4 is a schematic diagram illustrating a section along line IV-IV in FIG. 2. FIG. 5 is a schematic diagram illustrating a section in a comparative example and corresponding to FIG. 4.

As illustrated in FIG. 4, alignment films 610 are provided on the wires 201 and 203 on the array substrate 2 and the strip-shaped electrode 310 on the counter substrate 3. The upper surface of the array substrate 2 is a front surface 2a on which wires and terminals are provided, and the lower surface thereof is a back surface 2b opposite the front surface 2a. The lower surface of the counter substrate 3 is a front surface 3a on which wires and terminals are provided, and the upper surface thereof is a back surface 3b opposite the front surface 3a. A liquid crystal layer 4 is filled between the array substrate 2 and the counter substrate 3 and sealed by a seal 600. An end 310a of the strip-shaped electrode 310 and an end 203a of the wire 203 have the same position in the Y direction, the Y1 side relative to the position is a shaded region (ineffective region) A11, and the Y2 side relative to the position is a non-shaded region (effective region) B11. A boundary P1 between the shaded region A11 and the non-shaded region B11 coincides with the ends 310a and 203a in the Y direction.

As illustrated in FIG. 5, in the comparative example, normal wires 209 and 309 are provided on the array substrate 2 and the counter substrate 3. Of ends 209a and 309a of the wires 209 and 309, the end 209a is positioned on the Y2 side, and accordingly, the position of the end 209a is a boundary P2 between a shaded region A12 and a non-shaded region B12. Comparison between FIGS. 4 and 5 indicates that the shaded region A11 in FIG. 4 is larger.

As described above, according to the first embodiment, each light adjustment panel 1 includes the strip-shaped electrodes 310, 320, 330, and 340 extending along sides of a polygon. The strip-shaped electrodes 310, 320, 330, and 340 are disposed along all sides of the panel unit 110 when the panel unit 110 is viewed in the up-down direction (first direction). The strip-shaped electrodes 310, 320, 330, and 340 are metal electrodes having shading capability. Specifically, the strip-shaped electrodes 310, 320, 330, and 340 contain at least one of molybdenum (Mo), aluminum (Al), nickel (Ni), and copper (Cu).

As described above, since the strip-shaped electrodes 310, 320, 330, and 340 are metal electrodes having shading capability, it is possible to provide the light adjustment device 100 with less light leakage according to the present embodiment. In a case, for example, shading tapes are attached to substrates to provide the light adjustment device 100 with a shading function, but in this case, the shading tapes are attached only for the shading function. However, in the present embodiment, the strip-shaped electrodes have the shading function. The strip-shaped electrodes have both an electrode function and a shading function, and thus require less manufacturing man-hours and lower cost than the shading tapes do.

The strip-shaped electrodes 310, 320, 330, and 340 provided on each light adjustment panel 1 extend along all sides. Thus, light leakage from the light adjustment device 100 can be reduced with at least one of the stacked light adjustment panels.

The array substrate 2 and the counter substrate 3 in each light adjustment panel 1 are each provided with a wire, and the wires are electrically coupled to each other through a conductive pillar. Thus, the flexible printed circuits 400 need not be coupled to both the array substrate 2 and the counter substrate 3, but need only be coupled to one of the array substrate 2 and the counter substrate 3.

Second Embodiment

Figure 6:
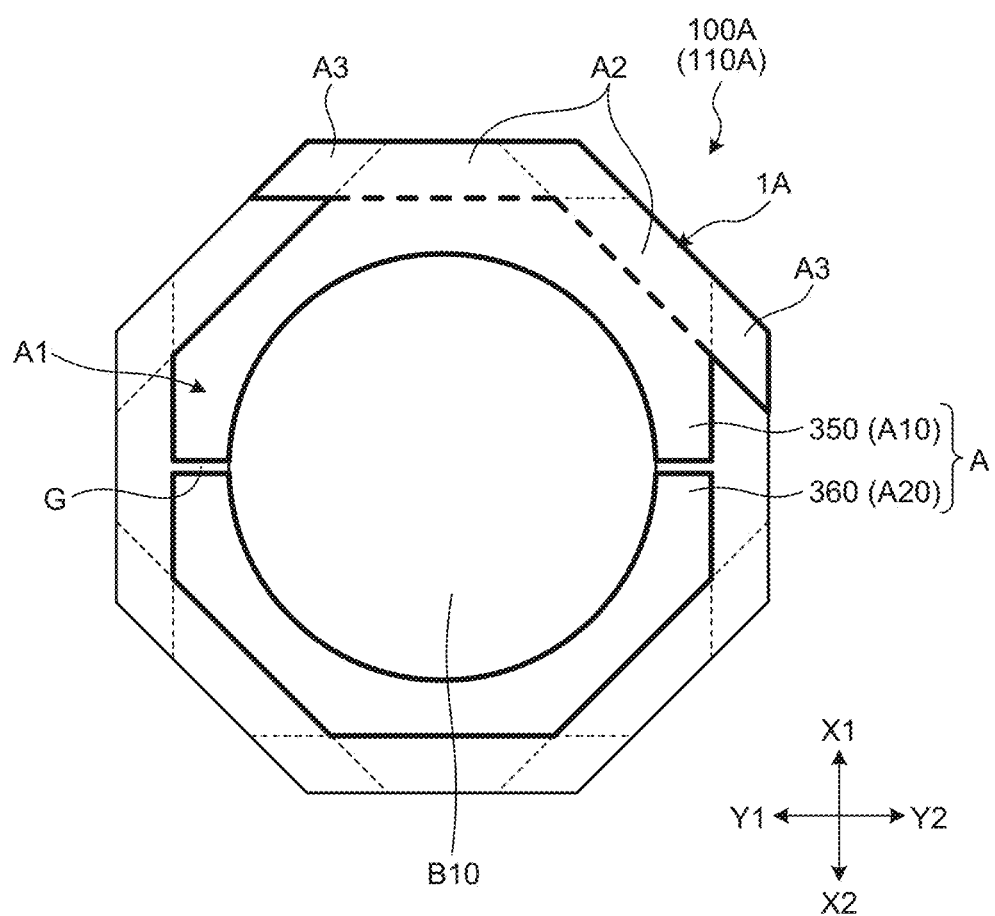
FIG. 6 is a plan view schematically illustrating a light adjustment device according to a second embodiment.
Figure 7:
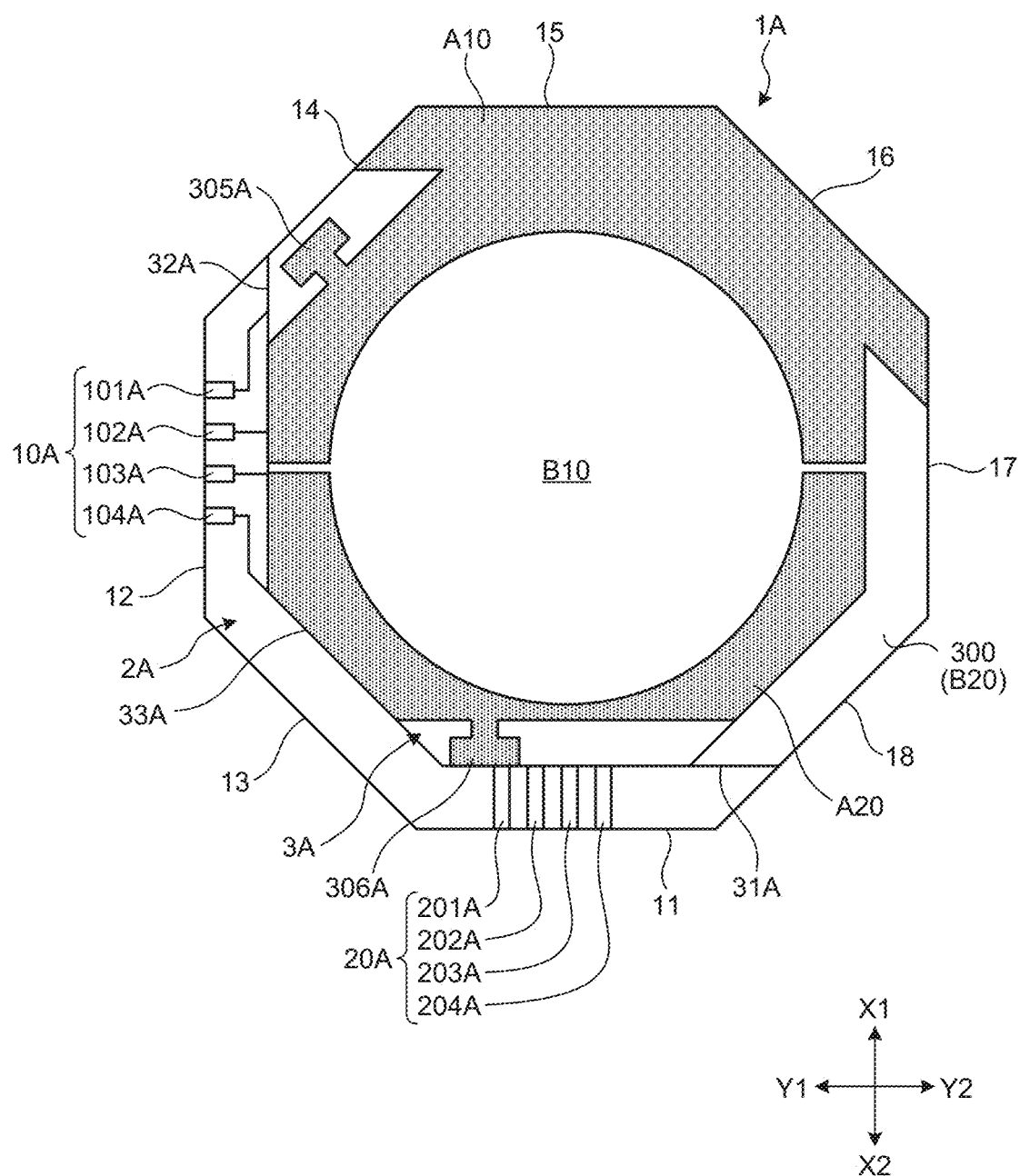
FIG. 7 is a schematic diagram of a light adjustment panel included in the light adjustment device in FIG. 6 when viewed from the upper side.
Figure 8:
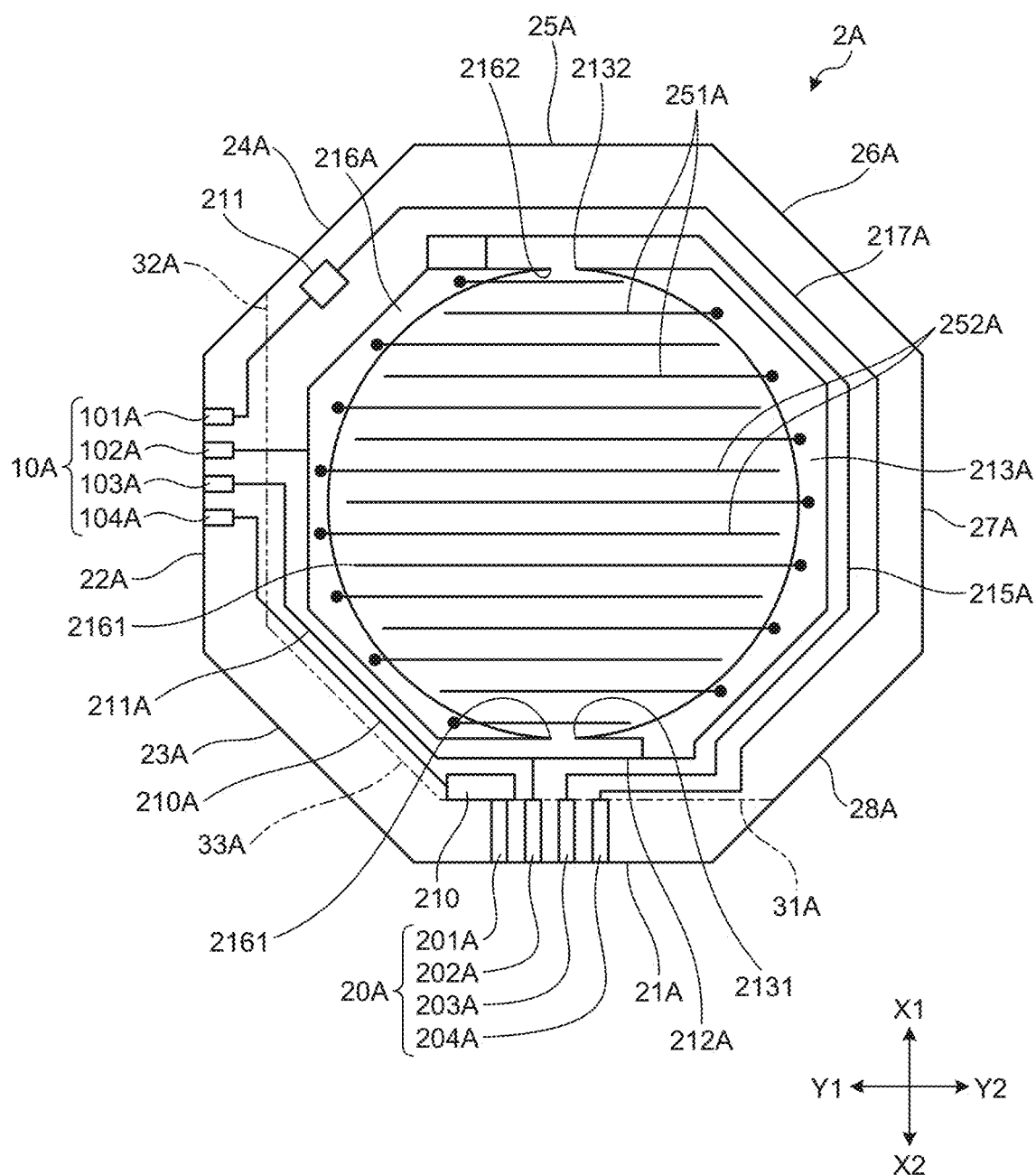
FIG. 8 is a schematic diagram of an array substrate included in the light adjustment panel in FIG. 7 when viewed from the upper side.
Figure 9:
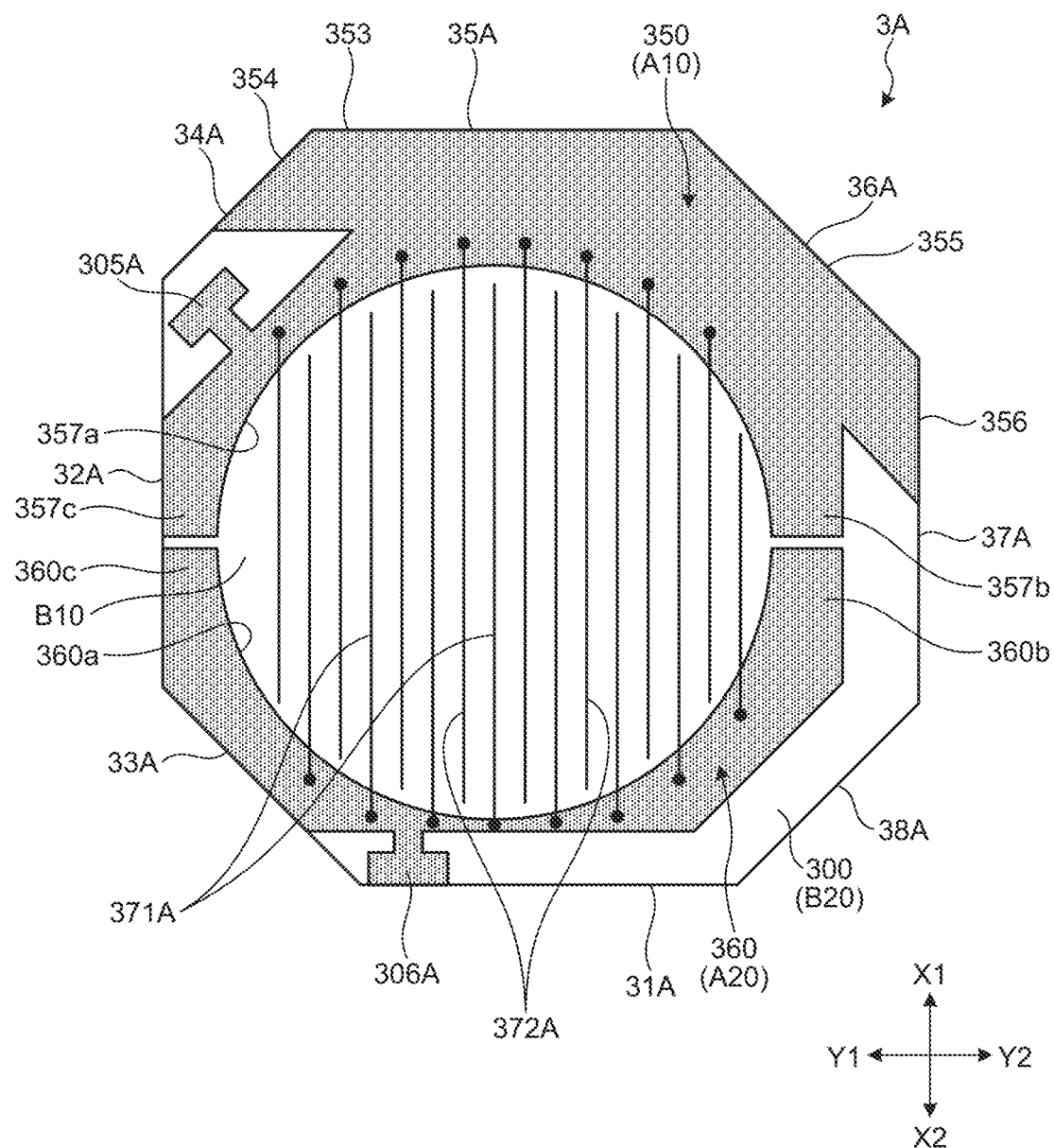
FIG. 9 is a schematic diagram of a counter substrate included in the light adjustment panel in FIG. 7 when viewed from the upper side.

A second embodiment will be described below. FIG. 6 is a plan view schematically illustrating a light adjustment device according to the second embodiment. FIG. 7 is a schematic diagram of a light adjustment panel included in the light adjustment device in FIG. 6 when viewed from the upper side. FIG. 8 is a schematic diagram of an array substrate included in the light adjustment panel in FIG. 7 when viewed from the upper side. FIG. 9 is a schematic diagram of a counter substrate included in the light adjustment panel in FIG. 7 when viewed from the upper side.

A light adjustment device 100A according to the second embodiment includes four stacked light adjustment panels each shaped as a regular octagon. Specific description is given below. As illustrated in FIG. 6, a panel unit 110A included in the light adjustment device 100A is shaped as a regular octagon in plan view, provided with a circular light adjustment region (translucent region or effective region) B10 at a center, and provided with a shaded region A in a peripheral region (frame region) on the outer periphery side relative to the light adjustment region B10. The light adjustment region B10 is a circular region that is irradiated with light from the light source. A light adjustment panel 1A illustrated in FIG. 7 is positioned uppermost among the stacked light adjustment panels, and thus only the light adjustment panel 1A is illustrated with solid lines in FIG. 6.

As illustrated in FIG. 7, the light adjustment panel 1A is shaped as a regular octagon in plan view. The light adjustment panel 1A has a first side 11, a second side 12, a third side 13, a fourth side 14, a fifth side 15, a sixth side 16, a seventh side 17, and an eighth side 18. The light adjustment panel 1A includes two terminal groups (terminal groups 10A and 20A). The terminal group 10A is provided at an edge part along the second side 12, and the terminal group 20A is provided at an edge part along the first side 11. The light adjustment panel 1A includes an array substrate (first substrate) 2A that is translucent and a counter substrate (second substrate) 3A that is translucent and disposed on the upper side relative to the array substrate 2A. The array substrate 2A will be described below.

As illustrated in FIG. 8, in the present embodiment, the array substrate 2A is shaped as a regular octagon and has a first side 21A, a second side 22A, a third side 23A, a fourth side 24A, a fifth side 25A, a sixth side 26A, a seventh side 27A, and an eighth side 28A. As illustrated in FIG. 8, wires, liquid crystal drive electrodes, and coupling portions are provided on the array substrate 2A. A coupling portion 210 of the array substrate 2A and a coupling portion 306A of the counter substrate 3A (refer to FIG. 9) are electrically coupled to each other through a conductive pillar (not illustrated) through which conduction is possible. Similarly, a coupling portion 211 of the array substrate 2A and a coupling portion 305A of the counter substrate 3A (refer to FIG. 9) are electrically coupled to each other through a conductive pillar (not illustrated) through which conduction is possible.

As illustrated in FIG. 8, the terminal group 10A includes a first terminal 101A, a second terminal 102A, a third terminal 103A, and a fourth terminal 104A. The first terminal 101A, the second terminal 102A, the third terminal 103A, and the fourth terminal 104A are arranged in the X direction.

The terminal group 20A includes a fifth terminal 201A, a sixth terminal 202A, a seventh terminal 203A, and an eighth terminal 204A. The fifth terminal 201A, the sixth terminal 202A, the seventh terminal 203A, and the eighth terminal 204A are arranged in the Y direction.

As illustrated in FIG. 8, a pair of semicircular wires 216A and 213A are disposed facing each other at a central part of the array substrate 2A. The wire 216A is positioned on the Y1 side, and the wire 213A is positioned on the Y2 side. The wire 216A extends from an end 2161 to an end 2162. The wire 213A extends from an end 2131 to an end 2132. The wires 216A and 213A have circular arc inner peripheries, and the inner periphery of the wire 216A and the inner periphery of the wire 213A form a circle of an effective region B (refer to FIG. 7).

The first terminal 101A and the eighth terminal 204A are coupled to each other through a wire 217A. The coupling portion 211 is coupled to the wire 217A. The second terminal 102A is coupled to the wire 216A. The third terminal 103A and the sixth terminal 202A are coupled to each other through a wire 211A. The fourth terminal 104A and the fifth terminal 201A are coupled to each other through a wire 210A and the coupling portion 210. The coupling portion 210 is coupled to the wire 210A. The sixth terminal 202A is coupled to the wire 213A through a wire 212A. The seventh terminal 203A is coupled to the wire 216A through a wire 215A. The wire 215A is disposed on the inner side relative to the wire 217A (center side of the substrate), and the wire 213A is disposed on the inner side relative to the wire 215A.

A plurality of liquid crystal drive electrodes 251A are coupled to the wire 213A. The liquid crystal drive electrodes 251A extend straight in the Y direction. The liquid crystal drive electrodes 251A are disposed at equal intervals in the X direction. A plurality of liquid crystal drive electrodes 252A are coupled to the wire 216A. The liquid crystal drive electrodes 252A extend straight in the Y direction. The liquid crystal drive electrodes 252A are disposed at equal intervals in the X direction. The liquid crystal drive electrodes 251A and 252A are alternately arranged in the X direction.

As illustrated in FIG. 9, wires, liquid crystal drive electrodes, and coupling portions are provided on the counter substrate 3A. In the present embodiment, as illustrated in FIG. 9, the counter substrate 3A is shaped as an octagon slightly deformed from a regular octagon and has a first side 31A, a second side 32A, a third side 33A, a fourth side 34A, a fifth side 35A, a sixth side 36A, a seventh side 37A, and an eighth side 38A. When the counter substrate 3A is placed over the array substrate 2A, the first side 31A, the second side 32A, and the third side 33A are positioned on the inner side relative to the first side 21A, the second side 22A, and the third side 23A of the array substrate 2A as illustrated with dashed and double-dotted lines in FIG. 8. Specifically, as illustrated in FIG. 8, the first side 31A is positioned on the X1 side relative to the first side 21A, the second side 32A is positioned on the Y2 side relative to the second side 22A, and the third side 33A is positioned on the X1 side and the Y2 side relative to the third side 23A. Thus, in the light adjustment panel 1A, edge parts along the first side 21A, the second side 22A, and the third side 23A of the array substrate 2A are exposed as illustrated in FIGS. 7 and 8. Accordingly, the terminal groups 10A and 20A are exposed as well.

As illustrated in FIG. 9, a first wire 350 and a second wire 360 formed along the outer shape of the counter substrate 3A and the outer shape of the light adjustment region B10 are provided on the counter substrate 3A. The first wire 350 and the second wire 360 have sufficiently large widths to cooperatively function as a shading layer.

In this regard, schematic shapes of the first wire 350 and the second wire 360 will be described below with reference to FIG. 6. In FIG. 6, the outer shapes of the first wire 350 and the second wire 360 are illustrated with bold solid lines. Specifically, the shaded region A is formed on the counter substrate 3A by the two wires of the first wire 350 and the second wire 360. The shaded region A schematically includes a central portion A1 having a regular octagonal outer shape and formed with the circular light adjustment region B10 at the center, and an extension portion A2 provided outside two adjacent sides among the eight sides of the regular octagonal central portion A1. Since the light adjustment panel 1A has a regular octagonal outer shape, the regular octagonal shape of the central portion A1 is slightly smaller than the regular octagonal shape of the light adjustment panel 1A, and the extension portion A2 is provided across the two sides to fill the gap between the outer shape of the light adjustment panel 1A and the central portion A1. In this aspect, the extension portion A2 includes protrusion portions A3 protruding to adjacent sides when viewed from the central portion A1. A gap G is provided between the first wire 350 and the second wire 360 to avoid short circuit and light can transmit through the gap G, but the gap G is superimposed on the shading layer of another light adjustment panel 1A by stacking a plurality of light adjustment panels 1A as described below in detail.

The first wire 350 and the second wire 360 are disposed around the light adjustment region B10 as specifically illustrated in FIG. 9. The first wire 350 is disposed on the X1 side on the counter substrate 3A, and the second wire 360 is disposed on the X2 side on the counter substrate 3A. The first wire 350 and the second wire 360 contain at least one of molybdenum (Mo), aluminum (Al), nickel (Ni), and copper (Cu). Accordingly, the first wire 350 and the second wire 360 have shading capability. The first wire 350 and the second wire 360 may be each formed as a solid film of these metal layers or formed as a dense mesh of such metal materials. With the mesh, the shading layer potentially slightly transmits light, but the shading layers of a plurality of light adjustment panels 1A overlap one another by stacking the light adjustment panels 1A as described later. With this aspect, light passing through the shading layers as a whole is ultimately significantly reduced.

The first wire 350 includes a portion disposed between the light adjustment region B10 and each of the fifth side 35A and the sixth side 36A of the counter substrate 3A and extends to a part of the fourth side 34A and a part of the seventh side 37A. Accordingly, the first wire 350 constitutes a first shaded region A10 covering an area between the light adjustment region B10 and each of part of the second side 32A, part of the fourth side 34A, the fifth side 35A, the sixth side 36A, and part of the seventh side 37A. In other words, the first wire 350 is the first shaded region A10 covering an area between the light adjustment region B10 and at least one side (the second side 32A, the fourth side 34A, the fifth side 35A, the sixth side 36A, or the seventh side 37A) among the sides of the polygon. The first shaded region A10 constitutes the upper half (X1 side) of the central portion A1 of the shaded region illustrated in FIG. 6 and also constitutes the extension portion A2 and the protrusion portions A3. More specifically, an inner periphery 357a of the first wire 350 on the X2 side has a circular arc shape. End parts 357b and 357c are provided at ends of the first wire 350 on the X2 side. Edges 353 and 354 of the first wire 350 overlap the fifth side 35A and the fourth side 34A, respectively. Edges 355 and 356 of the first wire 350 overlap the sixth side 36A and the seventh side 37A, respectively. The first wire 350 includes the coupling portion 305A protruding from the central portion A1 of the shaded region toward the second side 32A of the counter substrate 3A. The coupling portion 305A is coupled to the first wire 350.

A non-shaded region B20 is provided at an edge part 300 along the first side 31A and the eighth side 38A of the counter substrate 3A. The second wire 360 is disposed between the non-shaded region B20 and the light adjustment region B10. The second wire 360 constitutes a second shaded region A20 covering an area between the light adjustment region B10 and the non-shaded region B20 provided along the edge part 300 at a part of the third side 33A, the first side 31A, the eighth side 38A, and a part of the seventh side 37A. In other words, the second wire 360 is the second shaded region A20 covering an area between the light adjustment region B10 and the non-shaded region B20 at the edge part 300 along other sides (the first side 31A and the eighth side 38A) among the sides. The second shaded region A20 constitutes the lower half (half on the X2 side) of the central portion A1 of the shaded region illustrated in FIG. 6 and is provided alongside the first shaded region A10 with the gap G therebetween. An inner periphery 360a of the second wire 360 has a circular arc shape. The second wire 360 extends from an end part 360b to an end part 360c. The second wire 360 includes the coupling portion 306A protruding from the central portion A1 of the shaded region toward the first side 31A of the counter substrate 3A. The coupling portion 306A is coupled to the second wire 360.

A plurality of liquid crystal drive electrodes 371A are coupled to the second wire 360. The liquid crystal drive electrodes 371A extend straight in the X direction. The liquid crystal drive electrodes 371A are disposed at equal intervals in the Y direction. A plurality of liquid crystal drive electrodes 372A are coupled to the first wire 350. The liquid crystal drive electrodes 372A extend straight in the X direction. The liquid crystal drive electrodes 372A are disposed at equal intervals in the Y direction. The liquid crystal drive electrodes 371A and 372A are alternately arranged in the Y direction.

Figure 10:
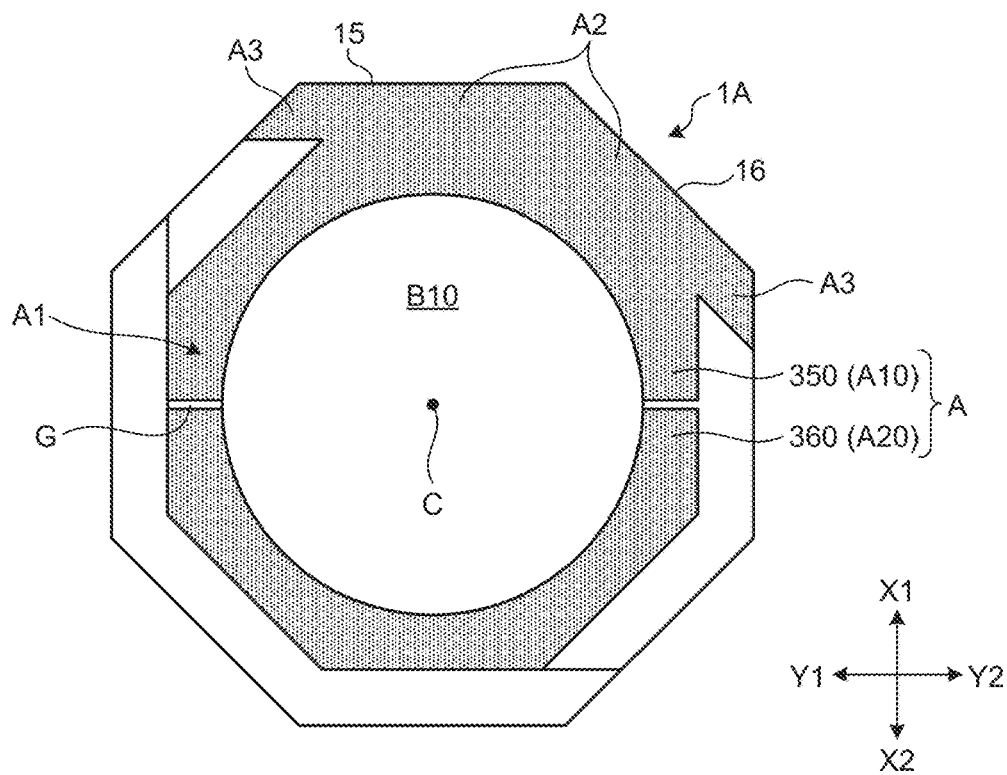
FIG. 10 is a schematic diagram of a first light adjustment panel included in the light adjustment device in FIG. 6 when viewed from the upper side.
Figure 11:
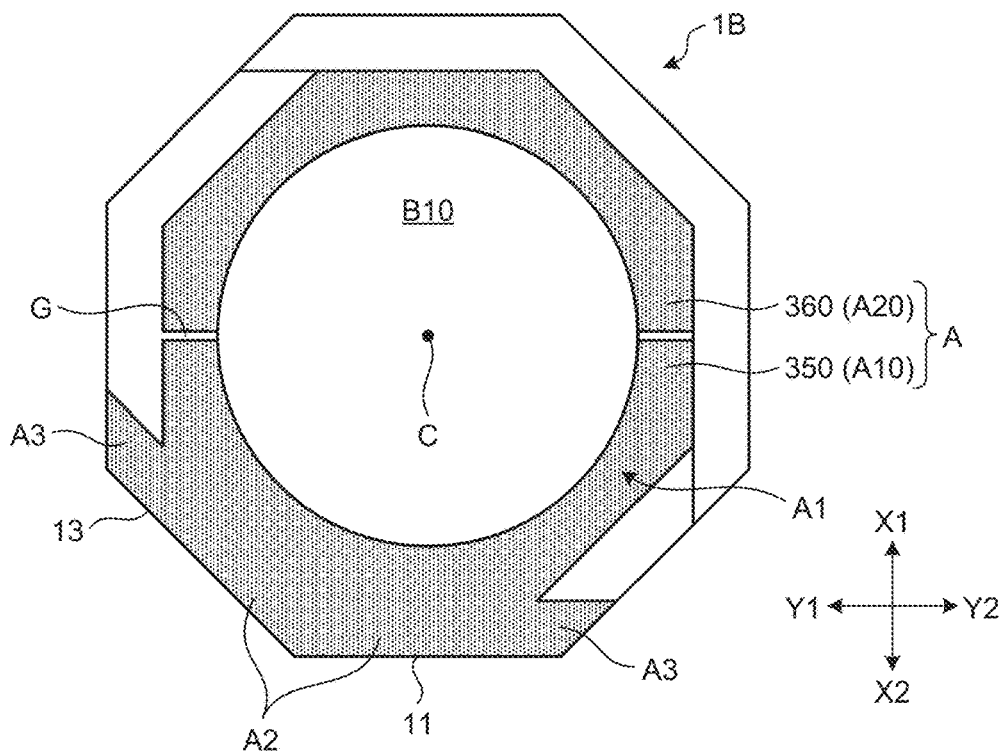
FIG. 11 is a schematic diagram of a second light adjustment panel included in the light adjustment device in FIG. 6 when viewed from the upper side.
Figure 12:
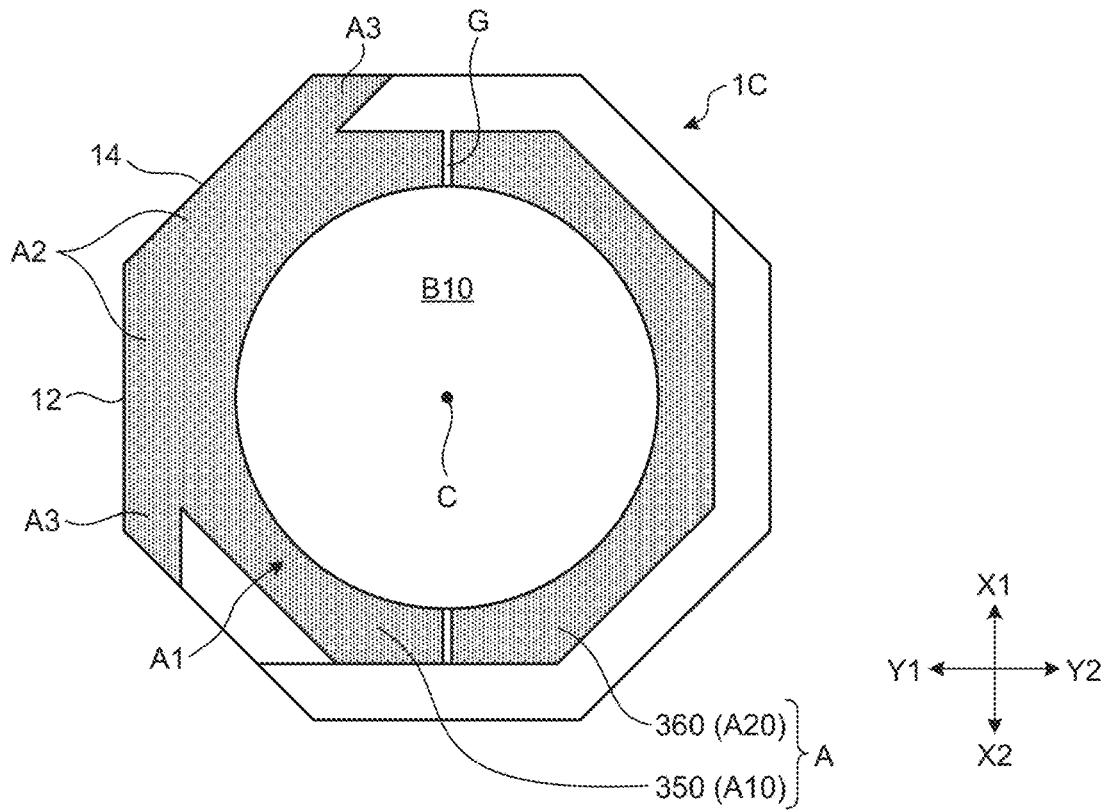
FIG. 12 is a schematic diagram of a third light adjustment panel included in the light adjustment device in FIG. 6 when viewed from the upper side.
Figure 13:
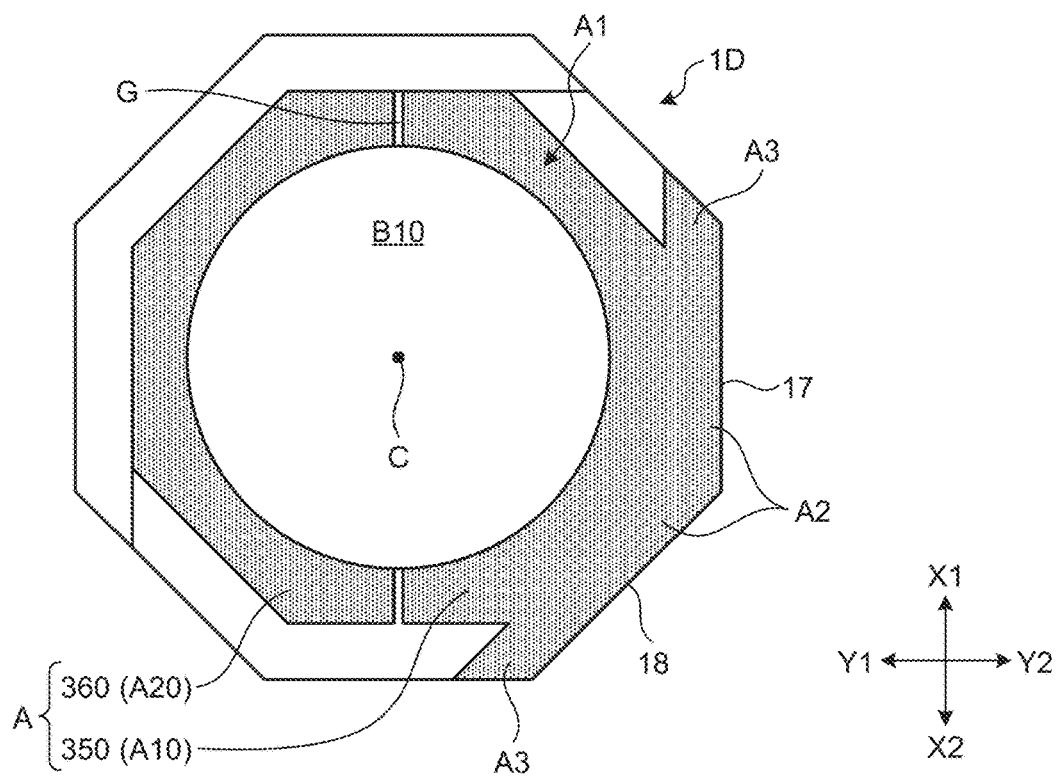
FIG. 13 is a schematic diagram of a fourth light adjustment panel included in the light adjustment device in FIG. 6 when viewed from the upper side.

The following describes a stacked state of light adjustment panels in the light adjustment device 100A. FIG. 10 is a schematic diagram of a first light adjustment panel included in the light adjustment device in FIG. 6 when viewed from the upper side. FIG. 11 is a schematic diagram of a second light adjustment panel included in the light adjustment device in FIG. 6 when viewed from the upper side. FIG. 12 is a schematic diagram of a third light adjustment panel included in the light adjustment device in FIG. 6 when viewed from the upper side. FIG. 13 is a schematic diagram of a fourth light adjustment panel included in the light adjustment device in FIG. 6 when viewed from the upper side.

In the panel unit 110A illustrated in FIG. 6, a light adjustment panel 1A, a light adjustment panel 1B, a light adjustment panel 1C, and a light adjustment panel 1D are stacked in order from the upper side. When the panel unit 110A is viewed in the up-down direction (first direction), the first wires 350 of the respective light adjustment panels, more specifically, the extension parts A2 of the shaded regions are disposed along all sides of the panel unit 110A and shade the non-shaded regions B20 of the respective light adjustment panels. In this manner, each gap G between the first wire 350 and the second wire 360 is stacked with shift from the other gaps G, and accordingly, the gap G overlaps the shaded region of another light adjustment panel.

As illustrated in FIG. 10, in the light adjustment panel 1A, the extension portion A2 of the first shaded region A10 are disposed along the fifth side 15 and the sixth side 16 as in FIG. 7.

The light adjustment panel 1B is stacked below the light adjustment panel 1A. As illustrated in FIG. 11, the light adjustment panel 1B is a 180° rotation of the light adjustment panel 1A about a center C of the panel. Accordingly, in the light adjustment panel 1B, the extension portion A2 of the first shaded region A10 are disposed along the first side 11 and the third side 13.

The light adjustment panel 1C is stacked below the light adjustment panel 1B. As illustrated in FIG. 12, the light adjustment panel 1C is a 90° rotation of the light adjustment panel 1A about a center C of the panel in the counterclockwise (leftward) direction. Accordingly, in the light adjustment panel 1C, the extension portion A2 of the first shaded region A10 are disposed along the second side 12 and the fourth side 14.

The light adjustment panel 1D is stacked below the light adjustment panel 1C. As illustrated in FIG. 13, the light adjustment panel 1D is a 90° rotation of the light adjustment panel 1A about a center C of the panel in the clockwise (rightward) direction. Accordingly, in the light adjustment panel 1D, the extension portion A2 of the first shaded region A10 is disposed along the seventh side 17 and the eighth side 18.

The following describes a shaded state of the light adjustment device 100A when viewed from the upper side. FIG. 14 is a schematic diagram illustrating the shaded state of the light adjustment device according to the second embodiment when viewed from the upper side. As illustrated in FIG. 14, since the light adjustment panel 1A is disposed uppermost in the panel unit 110A (light adjustment device 100A), the light adjustment device 100A is shaded by a region (hatched in FIG. 14) constituted by the first shaded region A10 and the second shaded region A20 (refer to FIG. 7) of the light adjustment panel 1A. Since the light adjustment panel 1B is positioned second uppermost below the light adjustment panel 1A, its portion not overlapping the first shaded region A10 of the light adjustment panel 1A when viewed from the upper side is a translucent region. A part of the translucent region is shaded by the first shaded region A10 of the light adjustment panel 1B. More specifically, the translucent region extends from a part of the fourth side 14 of the light adjustment panel 1A to a part of the eighth side 18 in the counterclockwise direction, and its portion extending from a part of the second side 12 to a part of the eighth side 18 is shaded by the first shaded region A10 of the light adjustment panel 1B (more specifically, the extension portion A2 of the shaded region A).

With the third uppermost light adjustment panel 1C placed over, a portion of the above-described translucent region, which extends from a part of the fifth side to a part of the second side 12 is shaded by the first shaded region A10 of the light adjustment panel 1C.

With the fourth uppermost light adjustment panel 1D further placed over, a portion of the above-described translucent region, which extends from a part of the seventh side to a part of the first side 11 is shaded by the first shaded region A10 of the light adjustment panel 1D.

Since the light adjustment panels 1A to 1D are disposed in this manner, the corresponding protrusion portions A3 of the shaded regions A of the adjacent light adjustment panels are superimposed on each other.

As described above, according to the second embodiment, the first wire 350 and the second wire 360 are provided on the counter substrate 3A in each light adjustment panel. The first wire 350 is the first shaded region A10 covering the area between the light adjustment region B10 and each of the fifth side 35A and the sixth side 36A. The second wire 360 is the second shaded region A20 covering the area between the light adjustment region B10 and the non-shaded region B20 at an edge part along the first side 31A, the seventh side 37A, and the eighth side 38A. When the panel unit 110A is viewed in the up-down direction (first direction), the first wires 350 of the light adjustment panels are disposed along all sides of the panel unit 110A and shade the non-shaded regions B20 of the light adjustment panels. The first wire 350 and the second wire 360 are metal electrodes containing at least one of molybdenum (Mo), aluminum (Al), nickel (Ni), and copper (Cu). In this manner, in the second embodiment, since one light adjustment panel 1A is provided with the first wire 350 having shading capability, the light adjustment device 100A with less light leakage can be provided by stacking the light adjustment panels 1A to 1D each obtained by rotating the light adjustment panel 1A by a predetermined angle in the circumferential direction to shift the position of the first wire 350 in the circumferential direction.

In each light adjustment panel 1A, the first wire 350 is provided along a plurality of adjacent sides (the second side 32A, the fourth side 34A, the fifth side 35A, the sixth side 36A, and the seventh side 37A). Thus, it is possible to dispose the first wires 350 along all sides of the panel unit 110A when the panel unit 110A is viewed in the up-down direction (first direction) with a smaller number of light adjustment panels than the number of light adjustment panels each provided with the first wire 350 along one side.

In each light adjustment panel 1A, the first wire 350 is provided on the counter substrate 3A. Thus, work man-hours and cost are lower than in a case where the first wires 350 are provided on both the array substrate (first substrate) 2A and the counter substrate 3A.

Since the array substrate 2A includes the two terminal groups 10A and 20A consisting of a plurality of terminals couplable to the flexible printed circuits 400, the directions in which the flexible printed circuits 400 are pulled out can be selected more freely than with a single terminal group.

The terminals (the first terminal 101A, the second terminal 102A, the third terminal 103A, and the fourth terminal 104A) included in the terminal group 10A are electrically coupled to the terminals (the fifth terminal 201A, the sixth terminal 202A, the seventh terminal 203A, and the eighth terminal 204A) included in the terminal group 20A. Thus, the flexible printed circuits 400 can be coupled to any of the terminal group 10A and the terminal group 20A.

In the present embodiment, each shading layer is formed by the first wire 350 and the second wire 360 on the counter substrate side, but instead, each shaded region may be formed by wires (the wires 210A to 217A) on the array substrate side, which are formed with large line widths or in a dense mesh.

First Modification

Figure 15:
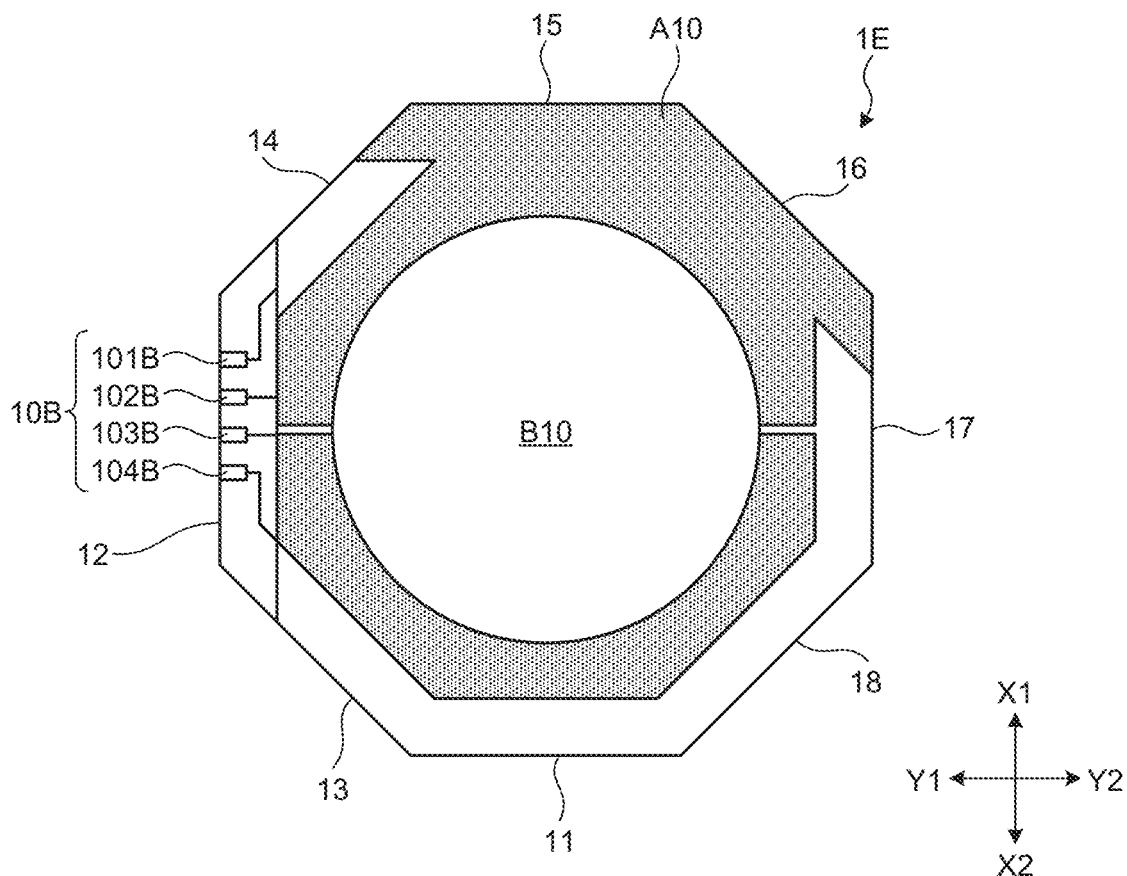
FIG. 15 is a plan view schematically illustrating a light adjustment panel according to a first modification.
Figure 16:
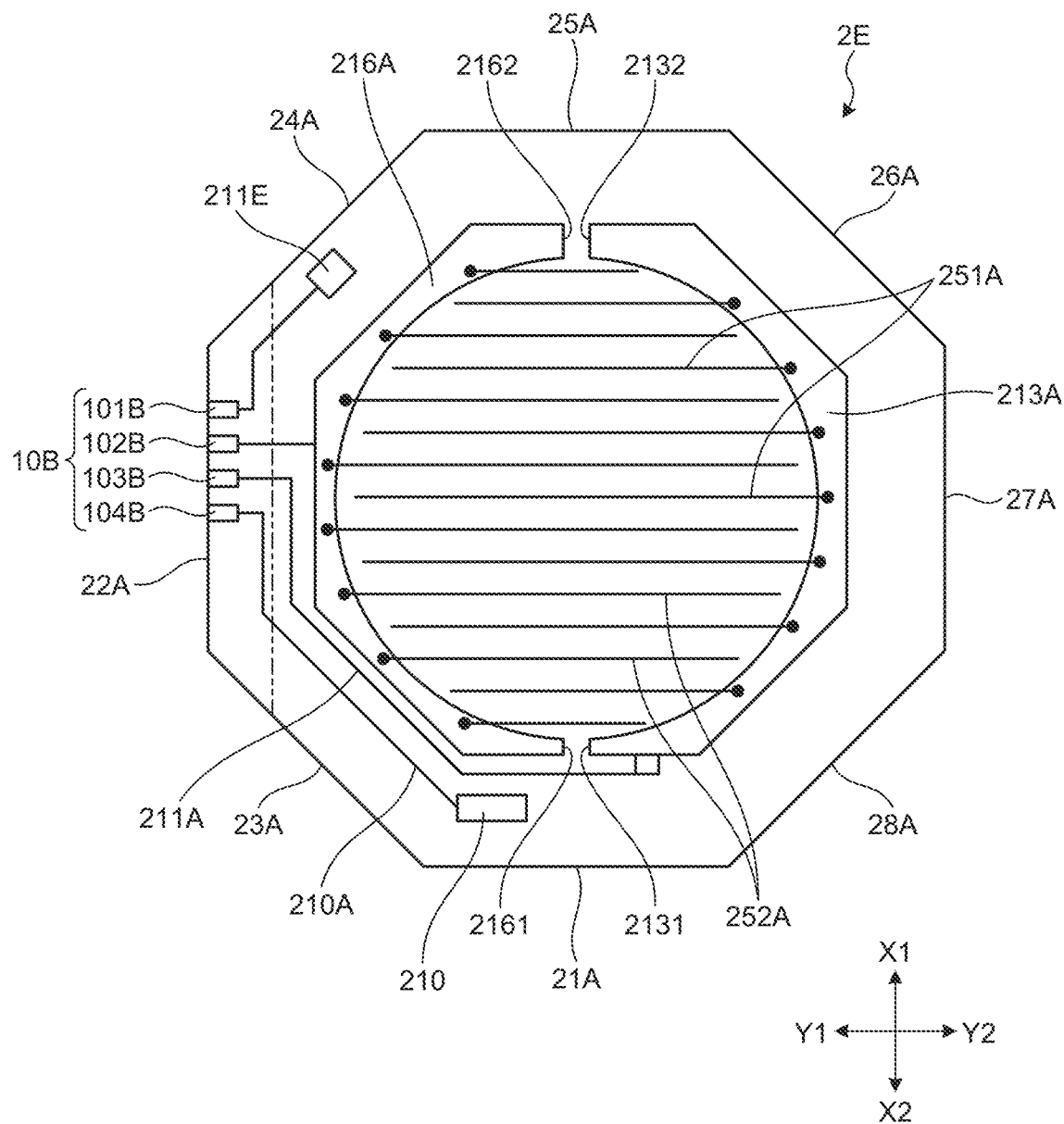
FIG. 16 is a schematic diagram of an array substrate included in the light adjustment panel in FIG. 15 when viewed from the upper side.
Figure 17:
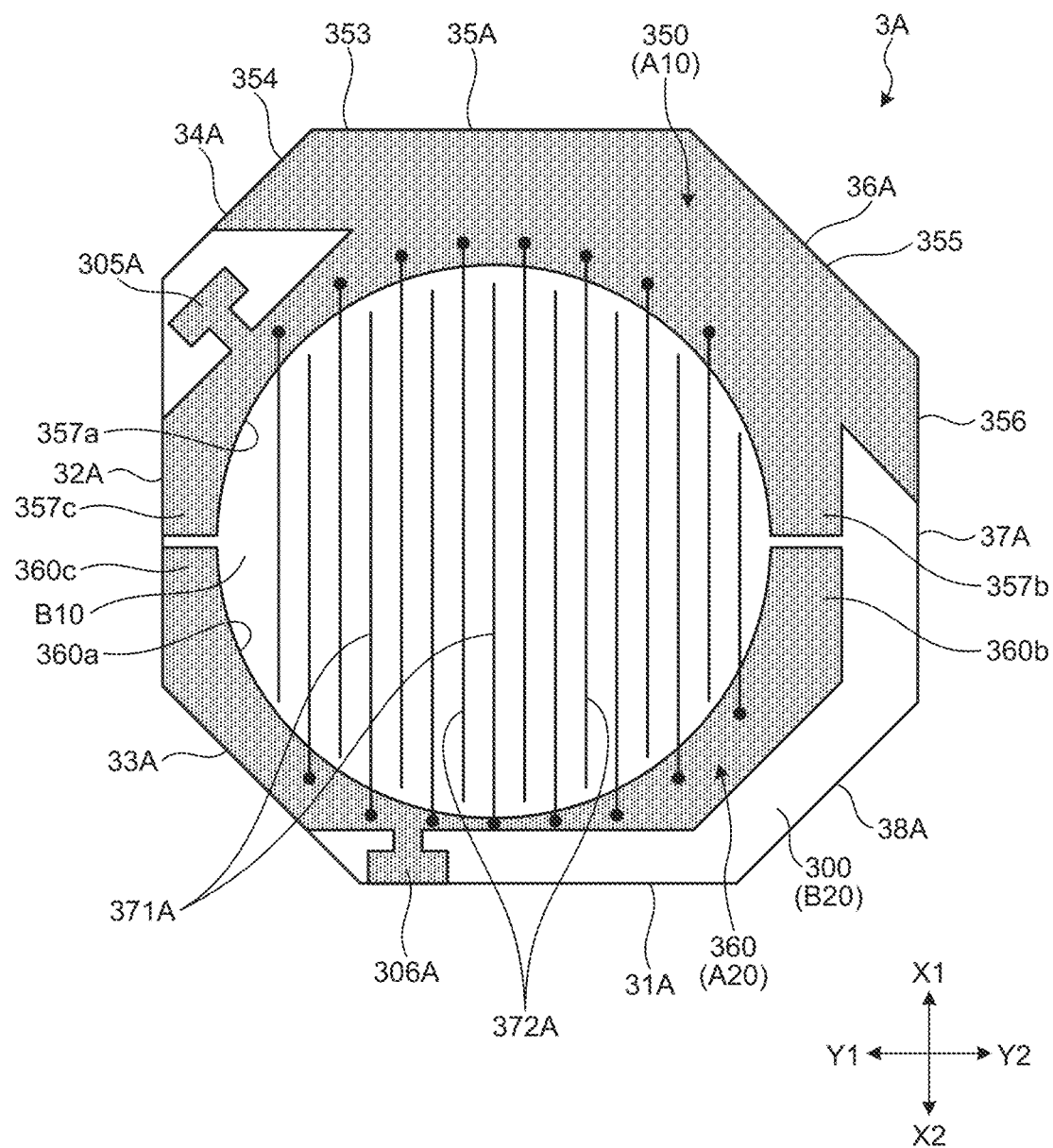
FIG. 17 is a schematic diagram of a counter substrate included in the light adjustment panel in FIG. 15 when viewed from the upper side.

The following describes a first modification. FIG. 15 is a plan view schematically illustrating a light adjustment panel according to the first modification. FIG. 16 is a schematic diagram of an array substrate included in the light adjustment panel in FIG. 15 when viewed from the upper side. FIG. 17 is a schematic diagram of a counter substrate included in the light adjustment panel in FIG. 15 when viewed from the upper side.

In the second embodiment, two terminal groups (terminal groups 10A and 20A) are provided on the light adjustment panel 1A, but in the first modification, one terminal group is provided. Hereinafter, difference from the second embodiment will be mainly described.

As illustrated in FIG. 15, a light adjustment panel 1E according to the first modification is shaped as a regular octagon in plan view. The light adjustment panel 1E includes one terminal group 10B. The terminal group 10B is provided at an edge part along the second side 12.

As illustrated in FIG. 16, a pair of semicircular wires 216A and 213A are disposed facing each other at a central part of an array substrate (first substrate) 2E. The wire 216A is positioned on the Y1 side, and the wire 213A is positioned on the Y2 side. The wire 216A extends from an end 2161 to an end 2162. The wire 213A extends from an end 2131 to an end 2132. The wires 216A and 213A have circular arc inner peripheries, and the inner periphery of the wire 216A and the inner periphery of the wire 213A form a circle of an effective region B (refer to FIG. 15). Coupling portions 210 and 211E are provided on the array substrate 2E, and coupling portions 305A and 306A are provided on a counter substrate 3A. The coupling portion 210 of the array substrate 2E and the coupling portion 306A of the counter substrate 3A (refer to FIG. 17) are electrically coupled to each other through a conductive pillar (not illustrated) through which conduction is possible. Similarly, the coupling portion 211E of the array substrate 2E and the coupling portion 305A (refer to FIG. 17) of the counter substrate 3A are electrically coupled to each other through a common electrode (not illustrated) through which conduction is possible.

A first terminal 101B is coupled to the coupling portion 211E. A second terminal 102B is coupled to the wire 216A. A third terminal 103B is coupled to the wire 213A through a wire 211A. A fourth terminal 104B is coupled to the coupling portion 210 through a wire 210A.

A plurality of liquid crystal drive electrodes 251A are coupled to the wire 213A. A plurality of liquid crystal drive electrodes 252A are coupled to the wire 216A.

The counter substrate 3A illustrated in FIG. 17 is the same as the counter substrate 3A (refer to FIG. 9) described above in the second embodiment.

As described above, according to the first modification, one terminal group 10B is provided on the light adjustment panel 1A, and thus the number of wires on the array substrate 2E is smaller and cost of the light adjustment panel 1A is lower than a case where two terminal groups are set.

Second Modification

Figure 18:
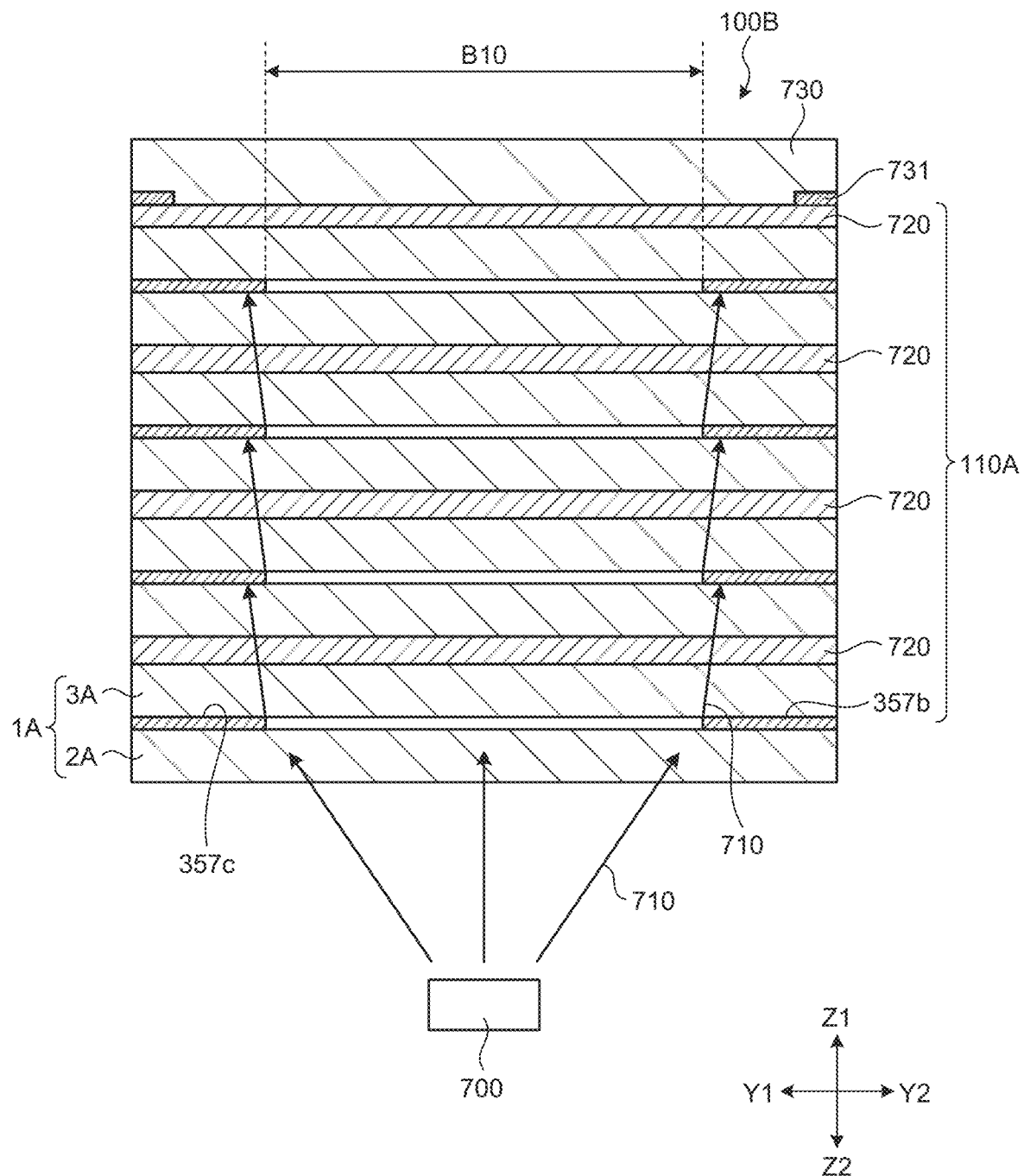
FIG. 18 is a sectional view schematically illustrating a light adjustment device according to a second modification.

The following describes a second modification. FIG. 18 is a sectional view schematically illustrating a light adjustment device according to the second modification.

A light adjustment device 100B according to the second modification includes a panel unit 110A, a light source 700, and a cover member 730.

The light source 700 is, for example, a light emitting diode (LED). Light 710 emitted from the light source 700 travels toward the upper side (Z1 side).

Four light adjustment panels 1A are stacked in the panel unit 110A. Each light adjustment panel 1A includes an array substrate 2A and a counter substrate 3A. As described above with reference to FIG. 9, a first wire 350 and a second wire 360 are provided on the counter substrate 3A, the first wire 350 includes an end part 357c on the Y1 side and an end part 357b on the Y2 side. In the second modification, the length of the end part 357c in the Y direction and the length of the end part 357b in the Y direction are the same for each light adjustment panel 1A. Accordingly, the diameter (size) of the light adjustment region B10 described with reference to FIG. 7 is the same for each light adjustment panel 1A.

The cover member 730 is provided at the upper end of the panel unit 110A. The cover member 730 is, for example, a decorative glass. The decorative glass is a glass base material that is a highly transparent inorganic base material to which colorant is added and fixed. A shading band 731 is provided on the lower surface of the cover member 730. The shading band 731 is printed on the cover member 730 by patterning, for example. The length of the shading band 731 in the Y direction is shorter than the length of the end part 357c in the Y direction and the length of the end part 357b in the Y direction. The cover member 730 may be formed of a non-decorative glass plate or a transparent resin.

The cover member 730 is bonded to the panel unit 110A through a translucent bonding agent 720. In addition, the light adjustment panels 1A adjacent to each other in the up-down direction are bonded to each other through the translucent bonding agent 720. For example, a translucent double-sided adhesive sheet (optical clear adhesive (OCA)) can be used as the translucent bonding agent 720.

As described above, according to the second modification, the cover member 730 is disposed on the upper side (the other side in the first direction) of a panel unit 110B. Thus, the panel unit 110A is protected by the cover member 730, and damage to the panel unit 110A is reduced. Moreover, by using a decorative glass as the cover member 730, the present modification can be applied to various applications with excellent appearance.

The diameter (size) of the light adjustment region B10 is the same for each light adjustment panel 1A. Accordingly, manufacturing man-hours and cost are lower than a case where a plurality of kinds of light adjustment panels having different diameters (sizes) of the light adjustment region B10 are stacked.

Third Modification

Figure 19:
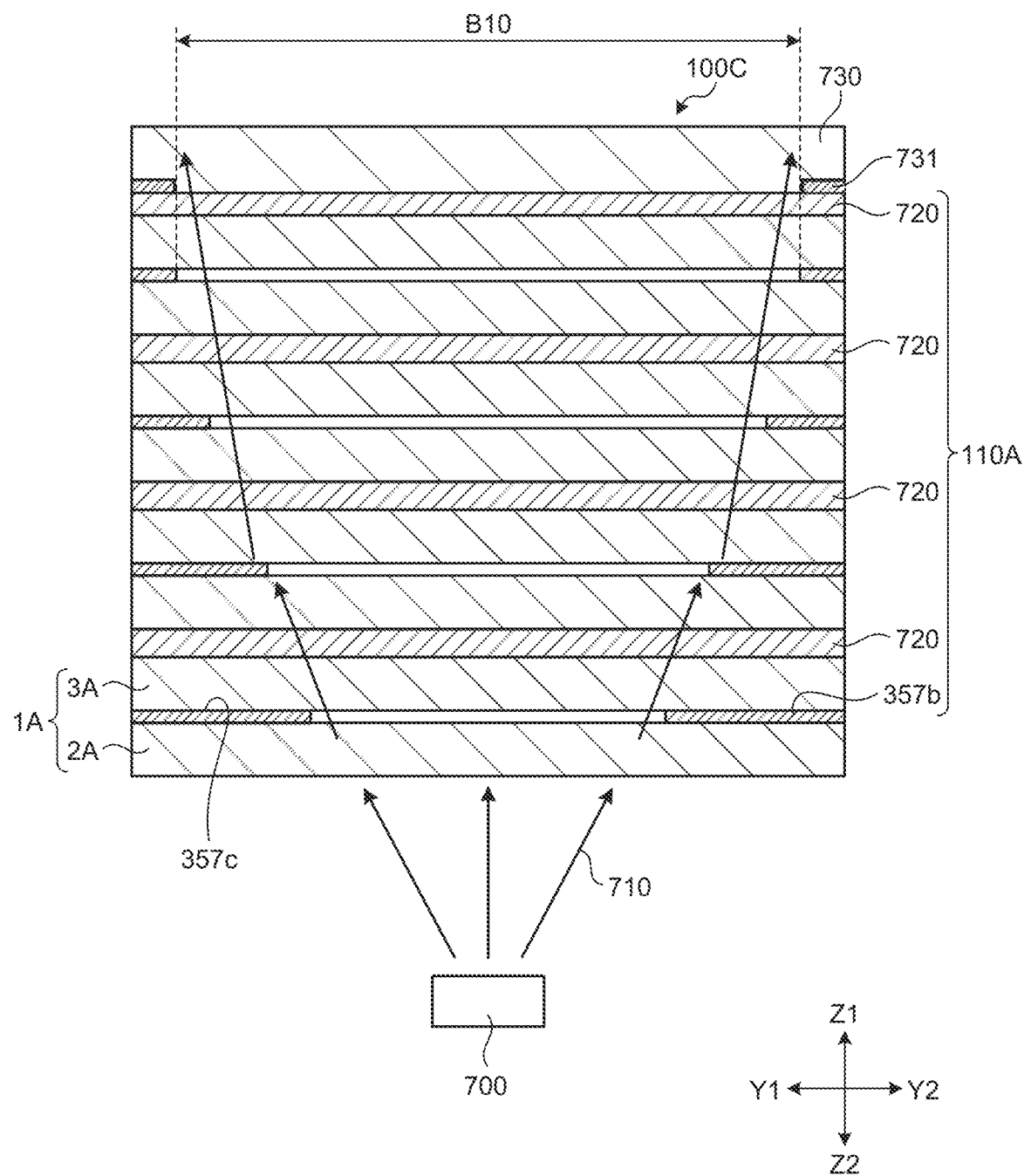
FIG. 19 is a sectional view schematically illustrating a light adjustment device according to a third modification.

The following describes a third modification. FIG. 19 is a sectional view schematically illustrating a light adjustment device according to the third modification.

In a light adjustment device 100C according to the third modification, unlike the light adjustment device 100B according to the second modification, the size of the effective region B is different for each light adjustment panel 1A. Brief description is given below.

As illustrated in FIG. 19, in the third modification, the diameter (size) of the light adjustment region B10 is larger for the upper light adjustment panel 1A. Specifically, the diameter (size) of the light adjustment region B10 of the second lowermost light adjustment panel 1A is larger than the diameter (size) of the light adjustment region B10 of the lowermost light adjustment panel 1A. The diameter (size) of the light adjustment region B10 of the third lowermost light adjustment panel 1A is larger than the diameter (size) of the light adjustment region B10 of the second lowermost light adjustment panel 1A, and the diameter (size) of the light adjustment region B10 of the uppermost light adjustment panel 1A is largest.

As described above, according to the third modification, since the diameter (size) of the light adjustment region B10 is larger for the upper light adjustment panel 1A, the light 710 output from the uppermost light adjustment panel 1A can be expanded.

Fourth Modification

Figure 20:
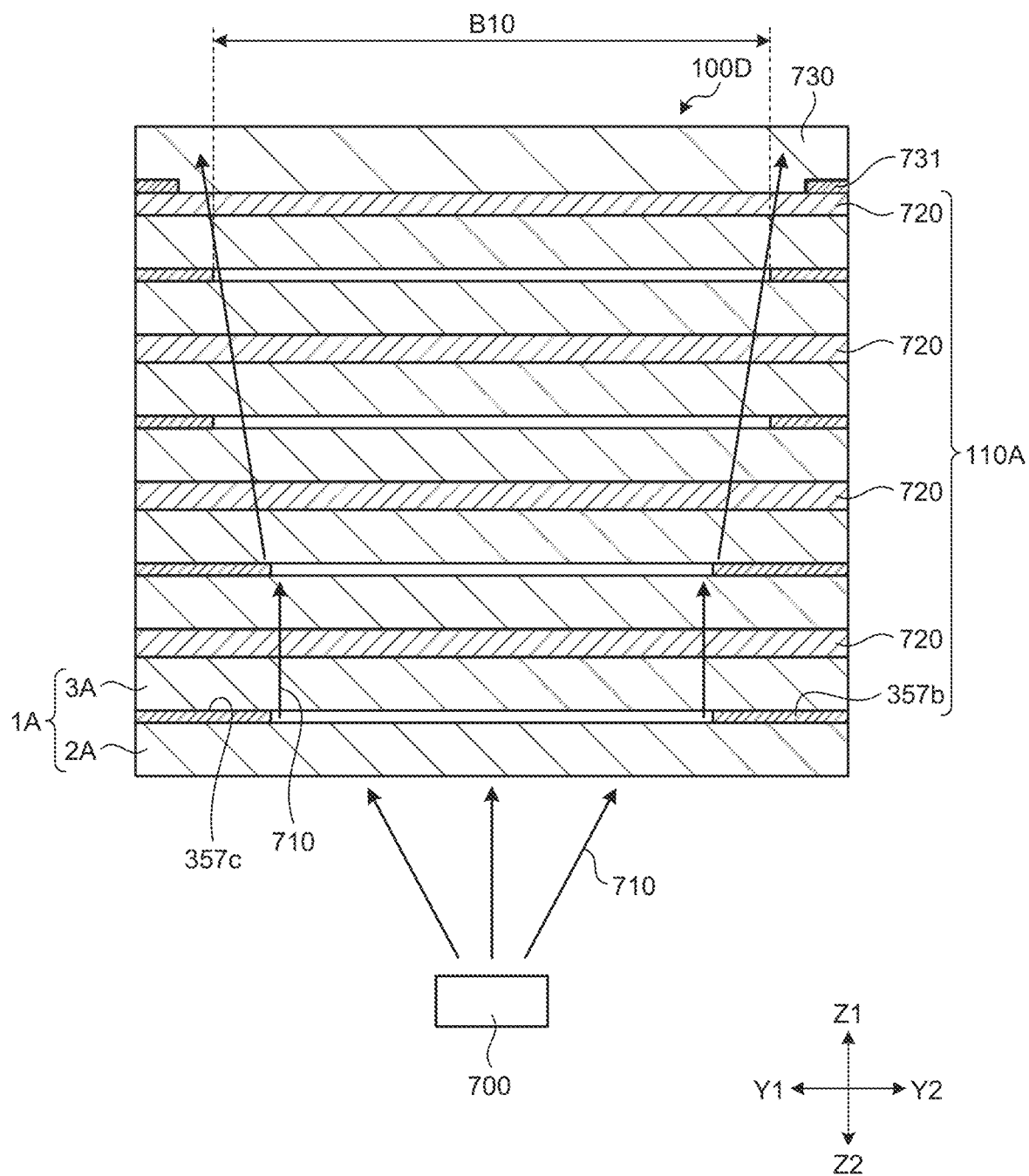
FIG. 20 is a sectional view schematically illustrating a light adjustment device according to a fourth modification.

The following describes a fourth modification. FIG. 20 is a sectional view schematically illustrating a light adjustment device according to the fourth modification.

In a light adjustment device 100D according to the fourth modification, the size of the effective region B is different for each two light adjustment panels 1A. Brief description is given below.

As illustrated in FIG. 20, in the fourth modification, the diameter (size) of the light adjustment region B10 is different between the upper two light adjustment panels 1A and the lower two light adjustment panels 1A. Specifically, the diameter (size) of the light adjustment region B10 of the lowermost light adjustment panel 1A and the diameter (size) of the light adjustment region B10 of the second lowermost light adjustment panel 1A are equal to each other. The diameter (size) of the light adjustment region B10 of the third lowermost light adjustment panel 1A and the diameter (size) of the light adjustment region B10 of the uppermost light adjustment panel 1A are equal to each other. The diameter (size) of the light adjustment region B10 of the third lowermost light adjustment panel 1A and the diameter (size) of the light adjustment region B10 of the uppermost light adjustment panel 1A are larger than the diameter (size) of the light adjustment region B10 of the lowermost light adjustment panel 1A and the diameter (size) of the light adjustment region B10 of the second lowermost light adjustment panel 1A.

As described above, according to the fourth modification, since the diameter (size) of the light adjustment region B10 is different for each two light adjustment panels 1A, manufacturing man-hours and cost of the light adjustment device are lower than in the third modification in which the diameter (size) of the light adjustment region B10 is different among all panels. Moreover, since the diameter (size) of the light adjustment region B10 is larger in the upper two light adjustment panels 1A than in the lower two light adjustment panel 1A, the light 710 output from the uppermost light adjustment panel 1A can be expanded.

What is claimed is:

1. A light adjustment device comprising:
a panel unit in which a plurality of light adjustment panels are stacked in a first direction, each light adjustment panel being shaped as a polygon and including a first substrate that is translucent and a second substrate that is translucent and overlapping the first substrate; and
a light source disposed on one side relative to the panel unit in the first direction, wherein
the first substrate or the second substrate in each of the light adjustment panels includes
a light adjustment region that is irradiated with light from the light source, and
a first wire and a second wire disposed around the light adjustment region,
the first wire serves as a first shaded region covering an area between at least one side among a plurality of sides of the polygon and the light adjustment region,
the second wire serves as a second shaded region covering an area between a non-shaded region at an edge part along another side among the sides and the light adjustment region, and
when the panel unit is viewed in the first direction, the first wires of the respective light adjustment panels are disposed along all sides of the panel unit and shade non-shaded regions of the respective light adjustment panels.

2. A light adjustment device comprising:
a panel unit in which a plurality of light adjustment panels are stacked in a first direction, each light adjustment panel being shaped as a polygon and including a first substrate that is translucent and a second substrate that is translucent and overlapping the first substrate; and
a light source disposed on one side relative to the panel unit in the first direction, wherein
the first substrate or the second substrate in each of the light adjustment panels is provided with a strip-shaped electrode extending along at least one side of the polygon and having shading capability, and
the strip-shaped electrodes are disposed along all sides of the panel unit when the panel unit is viewed in the first direction.

3. The light adjustment device according to claim 1, wherein the first wire contains at least one of molybdenum, aluminum, nickel, and copper.

4. The light adjustment device according to claim 2, wherein the strip-shaped electrodes contain at least one of molybdenum, aluminum, nickel, and copper.

5. The light adjustment device according to claim 1, wherein the first wire provided on the first substrate or the second substrate in one of the light adjustment panels is disposed at a plurality of adjacent sides.

6. The light adjustment device according to claim 1, wherein a cover member is disposed on another side relative to the panel unit in the first direction.

7. The light adjustment device according to claim 1, wherein the first substrate is provided with two or more terminal groups each consisting of a plurality of terminals couplable to a flexible printed circuit.

8. The light adjustment device according to claim 7, wherein among the two or more terminal groups provided on the first substrate, the terminals included in one terminal group are electrically coupled to the terminals included in another terminal group.

9. The light adjustment device according to claim 1, wherein each of the light adjustment panels includes a liquid crystal layer between the first substrate and the second substrate.

10. The light adjustment device according to claim 1, wherein the first substrate and the second substrate in each of the light adjustment panels are each provided with a wire, and the wires are electrically coupled to each other through a conductive pillar.

11. A panel unit in which a plurality of light adjustment panels are stacked in a first direction, each light adjustment panel including a first substrate that is translucent and a second substrate that is translucent and overlapping the first substrate, wherein
the first substrate or the second substrate in each of the light adjustment panels includes a light adjustment region that transmits light at a central part and also includes a peripheral region that encloses the light adjustment region, a part of the peripheral region being shaded by a shaded region, and the light adjustment panels are relatively rotated with respect to and superimposed on each other, and peripheral regions of the light adjustment panels are shaded by one another with the shaded regions thereof when the panel unit is viewed in the first direction.

* * * * *